(12) United States Patent
Lysak

(10) Patent No.: US 10,980,191 B2
(45) Date of Patent: Apr. 20, 2021

(54) DEER PROOF GARDEN ENCLOSURE AND METHOD OF MAKING

(71) Applicant: Kathleen Lysak, Parker, CO (US)

(72) Inventor: Kathleen Lysak, Parker, CO (US)

( * ) Notice: Subject to any disclaimer, the term of this patent is extended or adjusted under 35 U.S.C. 154(b) by 253 days.

(21) Appl. No.: 16/100,987

(22) Filed: Aug. 10, 2018

(65) Prior Publication Data

US 2019/0053440 A1  Feb. 21, 2019

Related U.S. Application Data

(60) Provisional application No. 62/545,804, filed on Aug. 15, 2017.

(51) Int. Cl.
*A01G 13/02* (2006.01)
*A01G 13/10* (2006.01)
(Continued)

(52) U.S. Cl.
CPC ....... *A01G 13/0206* (2013.01); *A01G 9/1438* (2013.01); *A01G 13/10* (2013.01);
(Continued)

(58) Field of Classification Search
CPC .... A01G 13/02; A01G 13/10; A01G 13/0206; A01G 2009/1446; A01G 2009/1461;
(Continued)

(56) References Cited

U.S. PATENT DOCUMENTS 309,658 A * 12/1884 Sinclair .............. D21F 1/14
245/10
326,872 A * 9/1885 Johnston ............ A01G 13/04
47/31
(Continued)

FOREIGN PATENT DOCUMENTS

CA   2067577 A1   10/1992
CA   2895977 A1 * 6/2014  ......... A44B 13/0052
(Continued)

OTHER PUBLICATIONS

Kurt C. VerCauteren et al. "Fences and Deer-Damage Management: A Review of Designs and Efficacy." USDA National Wildlife Research Center—Staff Publications. Wildlife Damage Management, Internet Center for Publications. Deer Fencing. <http://digitalcommons.unl.edu/icwdm_usdanwrc/99/>. Wildlife Society Bulletin. vol. 34, No. 1. pp. 192-200. Aug. 31, 2006.

*Primary Examiner* — Robert Canfield
(74) *Attorney, Agent, or Firm* — Faegre Drinker Biddle & Reath LLP

(57) ABSTRACT

A netting enclosure kit comprises a skeleton configured to operate in a plurality of configurations between a first, partially expanded configuration and a second, fully expanded configuration, a netting enclosure comprising a plurality of panels configured to be joined together to enclose or hang from the skeleton in each of the plurality of configurations, a first webbing configured to connect to a first portion of the netting enclosure, a second webbing configured to connect to a second portion of the netting enclosure, and a fastener configured to attached to the first webbing and to the second webbing to form an openable and closeable seam.

16 Claims, 18 Drawing Sheets

(51) Int. Cl.
  *A01G 9/14* (2006.01)
  *A01M 29/30* (2011.01)

(52) U.S. Cl.
  CPC ..... *A01M 29/30* (2013.01); *A01G 2009/1446* (2013.01); *A01G 2009/1461* (2013.01)

(58) Field of Classification Search
  CPC .......... A01M 29/30; B21F 27/08; F41H 3/02; D21F 1/0054; D21F 1/12
  USPC ......... 135/115, 117, 119, 913; 52/63; 256/5, 256/9, 29, 45–47, 57, 71; 47/31; 245/10
  See application file for complete search history.

(56) References Cited

U.S. PATENT DOCUMENTS

| | | | |
|---|---|---|---|
| 502,512 A * | 8/1893 | Ellwood | A01M 1/04 256/5 |
| 606,387 A * | 6/1898 | Kühn | E04C 2/426 52/662 |
| 1,058,142 A * | 4/1913 | Bernitt | E04H 15/48 135/154 |
| 1,074,904 A * | 10/1913 | Smith | A45C 13/04 150/120 |
| 1,311,927 A * | 8/1919 | Trotman | D21F 1/14 245/10 |
| 1,340,187 A * | 5/1920 | Sundback | A44B 19/24 24/416 |
| 1,747,272 A * | 2/1930 | Webb | D21F 1/14 245/10 |
| 1,930,336 A * | 10/1933 | Buell | D21F 1/14 245/10 |
| 1,935,631 A * | 11/1933 | Guba | B65G 17/06 245/10 |
| 1,973,189 A * | 9/1934 | Buchanan | D21F 1/16 245/10 |
| 2,185,588 A * | 1/1940 | Datz | E04H 15/00 135/147 |
| 2,905,281 A | 9/1959 | Zitomer | |
| 3,145,719 A | 8/1964 | Johnson | |
| 3,199,518 A | 8/1965 | Glidewell | |
| 3,323,530 A * | 6/1967 | Smith | A01M 31/00 135/157 |
| 3,827,019 A * | 7/1974 | Serbu | A41F 1/002 335/285 |
| 3,959,857 A * | 6/1976 | Stephens | A44B 19/384 24/381 |
| 4,192,333 A | 3/1980 | Sato | |
| 4,301,996 A * | 11/1981 | Holyoak | A01G 13/105 256/1 |
| 4,340,075 A | 7/1982 | Medeiros | |
| 4,395,844 A | 8/1983 | Jopson | |
| 4,416,928 A * | 11/1983 | Carl | A01G 9/1438 428/38 |
| 4,526,347 A * | 7/1985 | McLoughlin | E04H 17/04 245/5 |
| 4,607,656 A * | 8/1986 | Carter | E04H 15/50 135/122 |
| 4,641,676 A * | 2/1987 | Lynch | E04H 15/50 135/115 |
| 4,779,635 A * | 10/1988 | Lynch | E04H 15/50 135/145 |
| 4,811,751 A | 3/1989 | Maloney | |
| 4,827,957 A | 5/1989 | Chang | |
| 4,858,380 A | 8/1989 | Gayle | |
| 5,097,624 A | 3/1992 | Klayman et al. | |
| 5,197,504 A | 3/1993 | Howe | |
| 5,197,505 A | 3/1993 | Tate | |
| 5,267,724 A | 12/1993 | Heath et al. | |
| 5,275,188 A * | 1/1994 | Tsai | E04H 15/50 135/145 |
| 5,421,355 A | 6/1995 | Cantwell | |
| 5,421,356 A | 6/1995 | Lynch | |
| 5,479,744 A | 1/1996 | Meyer | |
| 5,511,572 A * | 4/1996 | Carter | E04H 15/50 135/145 |
| 5,544,446 A | 8/1996 | Benson, Jr. | |
| 5,674,496 A | 10/1997 | Etscorn et al. | |
| 5,901,727 A | 5/1999 | Kramer et al. | |
| 5,927,311 A | 7/1999 | Jager | |
| 5,930,948 A * | 8/1999 | Daniel | A01G 13/10 135/158 |
| 6,041,800 A | 3/2000 | Carter | |
| 6,070,604 A | 6/2000 | Carter | |
| 6,142,451 A | 11/2000 | Lindsey et al. | |
| 6,192,910 B1 | 2/2001 | Carter | |
| 6,230,729 B1 | 5/2001 | Carter | |
| 6,261,207 B1 | 7/2001 | Publicover et al. | |
| 6,363,956 B2 | 4/2002 | Carter | |
| 6,378,176 B1 * | 4/2002 | Scherer | A44B 19/38 24/433 |
| 6,439,251 B2 | 8/2002 | Carter | |
| 6,470,901 B1 | 10/2002 | Scherer | |
| 6,520,196 B2 | 2/2003 | Carter | |
| 6,666,223 B2 * | 12/2003 | Price | E04H 15/50 135/114 |
| 6,688,256 B1 | 2/2004 | King | |
| 6,712,083 B2 | 3/2004 | Carter | |
| 6,843,019 B2 | 1/2005 | Mercurio et al. | |
| 6,865,852 B2 * | 3/2005 | Gower | E04H 9/14 52/222 |
| 6,981,510 B2 | 1/2006 | Carter | |
| 7,240,687 B2 | 7/2007 | Carter | |
| 7,296,584 B2 | 11/2007 | Goldwitz | |
| 7,325,358 B1 | 2/2008 | Chalupsky et al. | |
| 7,481,236 B2 | 1/2009 | Carter | |
| 7,562,453 B1 * | 7/2009 | Benner | A01G 13/10 256/1 |
| 7,735,504 B2 | 6/2010 | Carter | |
| 7,921,864 B2 | 4/2011 | Carter | |
| D653,919 S | 2/2012 | Ward et al. | |
| 8,215,326 B2 * | 7/2012 | Park | E04H 15/44 135/121 |
| 8,308,141 B1 | 11/2012 | Mellins et al. | |
| 8,342,197 B2 | 1/2013 | Román et al. | |
| 8,702,068 B2 | 4/2014 | Mellins et al. | |
| 8,745,920 B1 | 6/2014 | Mills | |
| 8,840,090 B2 | 9/2014 | Moore | |
| 8,931,498 B2 * | 1/2015 | Nelson | E04H 15/36 135/117 |
| 9,013,961 B1 | 4/2015 | Nicholson et al. | |
| 9,181,723 B2 | 11/2015 | Schaefer | |
| 10,015,934 B2 * | 7/2018 | Harik | A01G 13/0243 |
| 2004/0049976 A1 | 3/2004 | Maffei | |
| 2005/0193624 A1 | 9/2005 | Singer | |
| 2005/0268544 A1 | 12/2005 | Maffei | |
| 2006/0000177 A1 | 1/2006 | Salzano et al. | |
| 2006/0185708 A1 | 8/2006 | Sylvestre et al. | |
| 2006/0207191 A1 * | 9/2006 | Sutton | E04H 9/14 52/4 |
| 2007/0130824 A1 | 6/2007 | Teich | |
| 2007/0266625 A1 * | 11/2007 | Markis | A01G 13/10 47/31 |
| 2008/0237558 A1 | 10/2008 | Jensen et al. | |
| 2009/0025652 A1 | 1/2009 | Jong | |
| 2009/0113792 A1 | 5/2009 | Amirjazil | |
| 2009/0179759 A1 | 7/2009 | Koury et al. | |
| 2009/0230373 A1 * | 9/2009 | Helseden | E04H 17/161 256/25 |
| 2009/0246241 A1 | 10/2009 | Pitt | |
| 2010/0124628 A1 * | 5/2010 | Ho | B29C 66/435 428/98 |
| 2010/0224848 A1 * | 9/2010 | Singer | A01M 29/30 256/25 |
| 2010/0243979 A1 | 9/2010 | Moore | |
| 2011/0114799 A1 * | 5/2011 | Ferraiolo | B65G 1/02 245/3 |
| 2011/0203172 A1 | 8/2011 | Bailey et al. | |
| 2011/0232174 A1 | 9/2011 | Mills | |
| 2011/0247266 A1 * | 10/2011 | McMichael | A01G 13/10 47/31.1 |

(56) References Cited

U.S. PATENT DOCUMENTS

| | | |
|---|---|---|
| 2011/0283610 A1 | 11/2011 | Dinihanian |
| 2012/0042601 A1 | 2/2012 | Perkins |
| 2014/0252173 A1* | 9/2014 | Suazo Luengo ....... A01K 61/60 245/10 |
| 2014/0270964 A1 | 9/2014 | Mund |
| 2014/0345537 A1 | 11/2014 | Moore |
| 2016/0088805 A1 | 3/2016 | Gyllenhammer et al. |
| 2016/0100532 A1* | 4/2016 | Romas ..................... A01G 9/02 47/30 |
| 2017/0145606 A1* | 5/2017 | Toye ..................... D04B 21/10 |

FOREIGN PATENT DOCUMENTS

| | | | | |
|---|---|---|---|---|
| CH | 132828 A | * | 5/1929 | ............. A01G 13/10 |
| EP | 62419 A | * | 10/1982 | ............. B21F 27/08 |
| EP | 0544361 A1 | | 6/1993 | |
| EP | 2642030 A1 | * | 9/2013 | ............. B21F 27/02 |
| FR | 861228 A | * | 2/1941 | ............... F41H 3/02 |
| FR | 1085586 A | * | 2/1955 | ............... F41H 3/02 |
| FR | 2680076 A1 | * | 2/1993 | ............. A01G 13/10 |
| JP | 09000138 A | * | 1/1997 | ............. A01G 13/10 |
| JP | 11223050 A | * | 8/1999 | |
| JP | 2000106766 A | * | 4/2000 | |
| JP | 2003119952 A | * | 4/2003 | |
| JP | 2008022786 A | * | 2/2008 | |
| WO | 1998034470 A1 | | 8/1998 | |
| WO | 2010111032 A1 | | 9/2010 | |
| WO | 2012056237 A1 | | 5/2012 | |

* cited by examiner

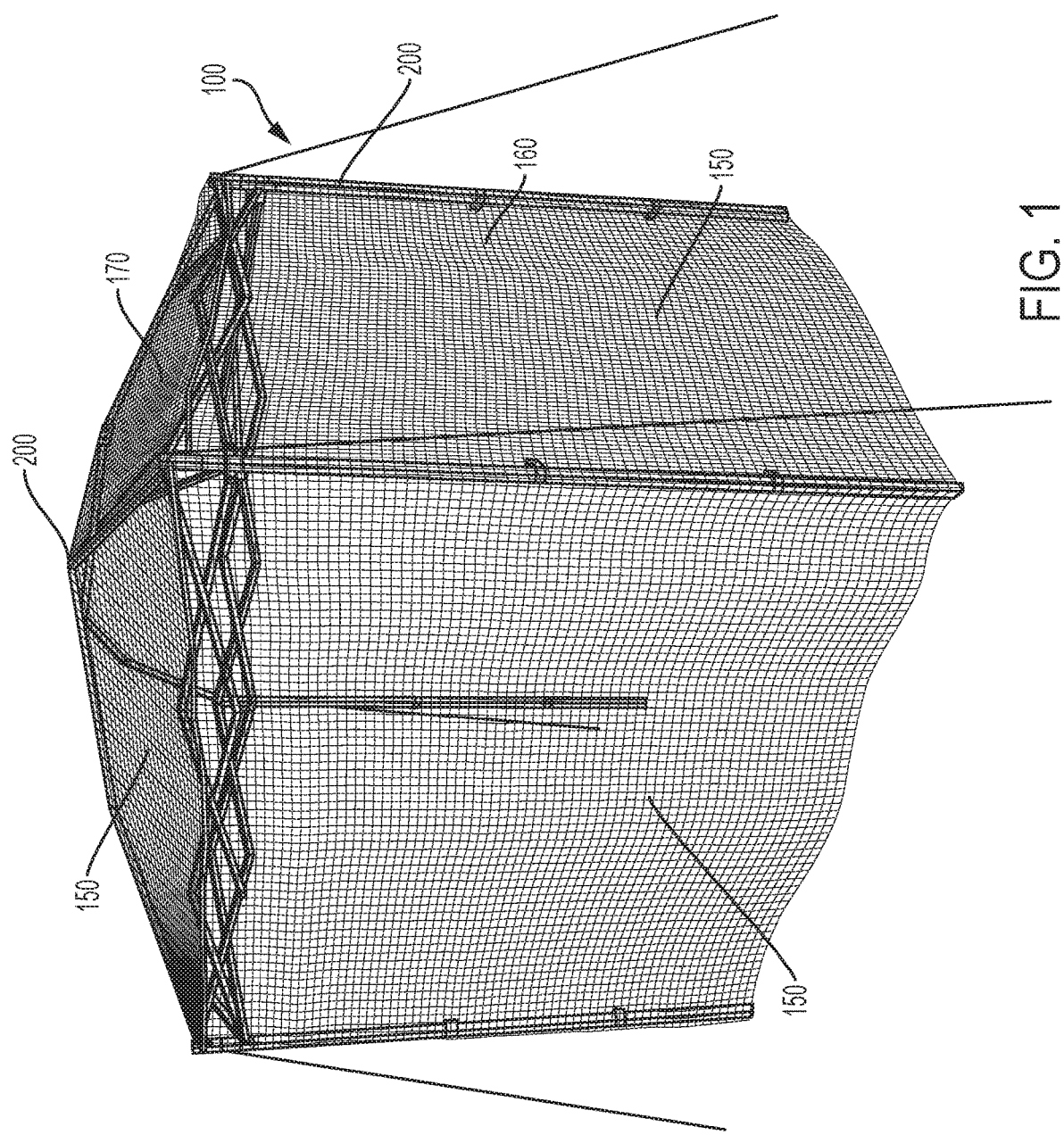

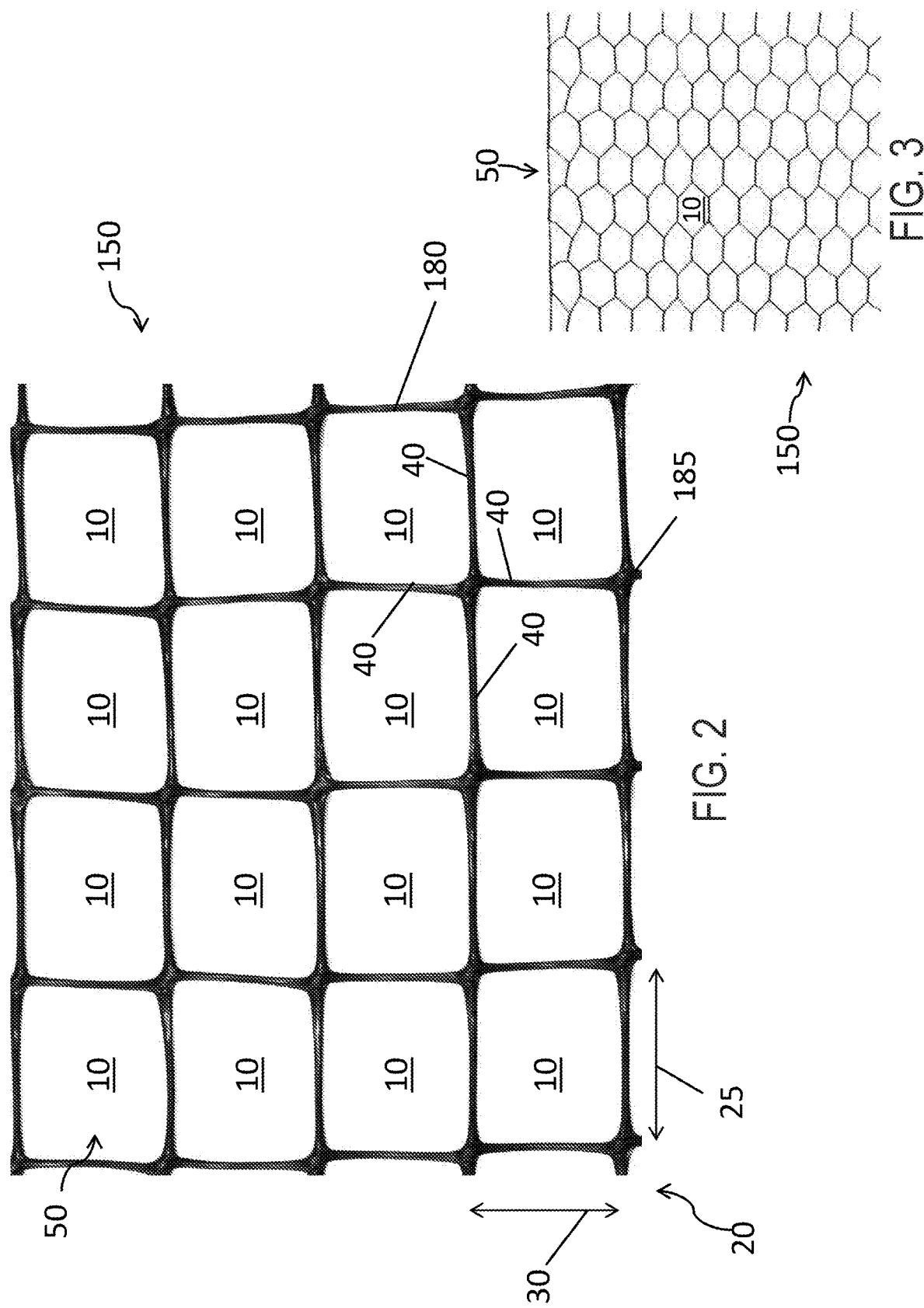

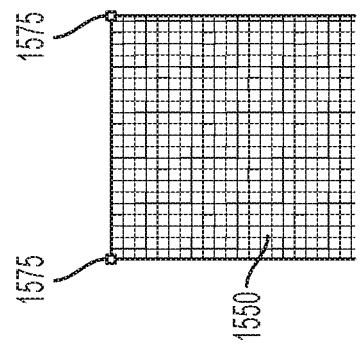
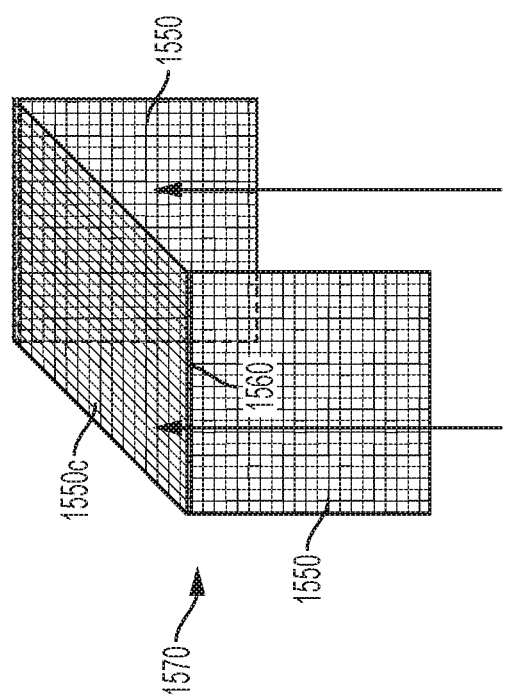
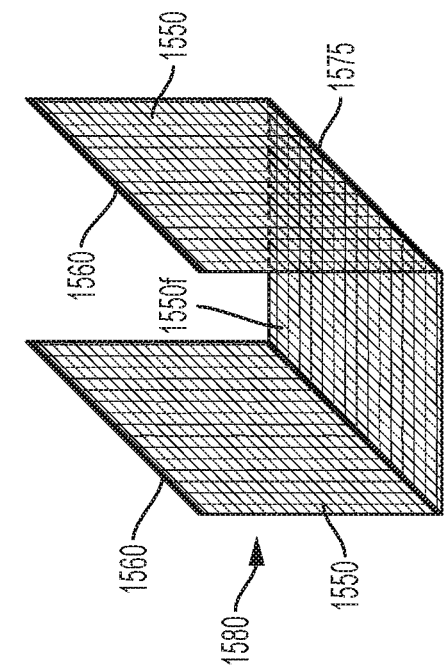

DEER PROOF GARDEN ENCLOSURE AND METHOD OF MAKING

FIELD OF THE DISCLOSURE

The present disclosure relates to systems for enclosures, including systems for protecting plants or a garden area from unwanted animal pests.

BACKGROUND OF THE DISCLOSURE

Animal pests can interfere with vegetable gardens by eating, damaging, or even destroying the plants prior to harvesting. Some approaches to this problem rely on synthetic chemicals applied to the plants and crops directly or onto the ground surrounding the plants. Other approaches rely on natural odors that would deter animal pests, such as the urine of predators. Many people prefer to grow their vegetables without chemicals, and even the natural odor products must be reapplied periodically, especially after rains.

Fencing products are also available, and are relatively easy to implement for preventing small animals, such as rabbits, from damaging garden plants. However, large animals, like deer, present a particular challenge because they can jump over, knock down, or pry open many of these fencing products. In general, fences must be at least eight feet tall to exclude deer. A fence of that height requires poles or posts sunk deeply into the ground for stability. In addition, covenant-controlled communities often restrict the height and style of permanent fence structures, making it impossible to erect an effective deer-proof fence.

There exists a need for a strong, stable and reasonably priced structure, easy to erect without installing poles or posts and easy to take down at the end of the season, wherein the structure is portable, reconfigurable, large enough to accommodate larger areas or compatible with smaller areas to meet the needs of casual gardeners, and attractive enough not to be challenged in covenant controlled communities.

SUMMARY

Embodiments of the present disclosure seek to address some or all of the issues discussed above. Some embodiments use a netting kit comprising: a skeleton configured to operate in a plurality of configurations between a first, partially expanded configuration and a second, fully expanded configuration; a netting enclosure comprising a plurality of panels configured to be joined together to enclose or hang from the skeleton in each of the plurality of configurations, a first webbing configured to connect to a first portion of the netting enclosure; a second webbing configured to connect to a second portion of the netting enclosure; and a fastener configured to be attached to the first webbing and to the second webbing to form an openable and closeable seam.

The netting kit described herein above, wherein the skeleton is changeable in shape between the partially expanded configuration and the fully expanded configuration.

The netting kit(s) described herein above, wherein the plurality of panels includes a third panel configured to overlap a fourth panel, the netting kit further comprising a third webbing configured to secure the third panel to the fourth panel by weaving in and out of cells in the third panel and the fourth panel.

The netting kit(s) described herein above, wherein the third webbing is configured to flexibly secure the third panel to the fourth panel without creating openings that permit animal access.

The netting kit(s) described herein above, wherein at least one of the plurality of panels is configured to prohibit burrowing animals.

The netting kit(s) described herein above, wherein the plurality of panels are joined together into two separate sections: a first section in which a first panel is orthogonally joined to two other panels and a second section in which at least two panels are orthogonally joined together, wherein the first section and the second section are configured to be joined together to enclose or hang from the skeleton.

The netting kit(s) described herein above, wherein the skeleton is configured to operate in the fully expanded configuration without sinking posts into the ground.

Another embodiment uses a netting enclosure for preventing deer access, the netting enclosure comprising: a plurality of panels each having a first face, a second face opposite the first face, and a plurality of cells encompassing openings connecting the first face and the second face, the plurality of cells sized to enable pollinator access while prohibiting access to deer; and at least one webbing material configured to join at least two adjacent panels together by alternately interconnecting cells of the adjacent panels to form a seam that prevents deer access between the adjacent panels.

The netting enclosure for preventing deer access described herein above, wherein at least a first panel, a second panel, and a third panel of the plurality of panels are joined together in a predefined configuration in which the first face of the first panel lies in a first plane, the first face of the second panel lies in a second plane substantially orthogonal to the first plane, and the first face of the third panel lies in a third plane substantially orthogonal to the second plane, and wherein the at least one webbing material is configured to join at least one of the first panel, the second panel, and the third panel to a fourth panel by alternately interconnecting cells of the panels to form the seam that prevents deer access.

The netting enclosure(s) for preventing deer access described herein above, wherein the plurality of panels includes a first panel having a first boundary and a second panel having a second boundary, wherein a portion of the first panel is configured to overlap a portion of the second panel, with the overlapping portions each including at least a portion of the cells.

The netting enclosure(s) for preventing deer access described herein above, wherein the first boundary and the second boundary overlap to align at least a portion of the cells of the first panel with at least a portion of the cells of the second panels, the webbing material configured to weave through the aligned cells of the first and second panels to form a rigid seam.

The netting enclosure(s) for preventing deer access described herein above, wherein the plurality of panels includes a first panel having a first edge portion and a second panel having a second edge portion, each edge portion including a plurality of the cells, the webbing material being configured to interconnect adjacent edge portions to form a foldable seam.

The netting enclosure(s) for preventing deer access described herein above, wherein at least one of the plurality of panels includes a fastening mechanism configured to create a seam that is openable and closeable.

The netting enclosure(s) for preventing deer access described herein above, wherein the at least one webbing material is configured to join two adjacent panel portions together by alternately interconnecting cells of the adjacent panel portions to form the seam without a skeletal structural member.

According to yet another embodiment, a method of making a netting enclosure to prevent animal access, the method comprising: shaping panels of netting material around a skeleton, the panels including cells encompassing openings configured to allow pollinator access and prohibit animal access; aligning cells of adjacent panels; and interconnecting adjacent panels with a webbing material and form a seam that prohibits animal access.

The method described herein above, wherein the step of aligning cells of adjacent panels includes overlapping a first portion of a first panel with a second portion of a second panel.

The method(s) described herein above, wherein the step of aligning cells of adjacent panels includes positioning a first plurality of cells of a first panel adjacently to a second plurality of cells of a second panel.

The method(s) described herein above, wherein the webbing material is a strap or a coil, and wherein interconnecting adjacent panels with the webbing material includes weaving the webbing material alternately through cells in adjacent panels.

The method(s) described herein above, further comprising installing a fastening mechanism at a seam of at least one of the interconnecting adjacent panels, the seam configured to be openable and closeable.

The method(s) described herein above, further comprising installing the netting enclosure onto a skeleton without using the webbing material interconnecting adjacent panels.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein:

FIG. 1 is a perspective view of an exemplary netting enclosure according to some embodiments of the present disclosure;

FIG. 2 is an partial view of a panel according to some embodiments of the present disclosure;

FIG. 3 is a partial view of a panel according to some embodiments of the present disclosure;

FIG. 15A is a perspective view of a first portion of a netting enclosure including a ceiling panel for a cube shaped enclosure according to some embodiments of the present disclosure;

FIG. 15B is a perspective view of a second portion of a netting enclosure including a floor panel for a cube shaped enclosure according to some embodiments of the present disclosure;

FIG. 15C is a side view of the first portion in FIG. 15A;

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 4:
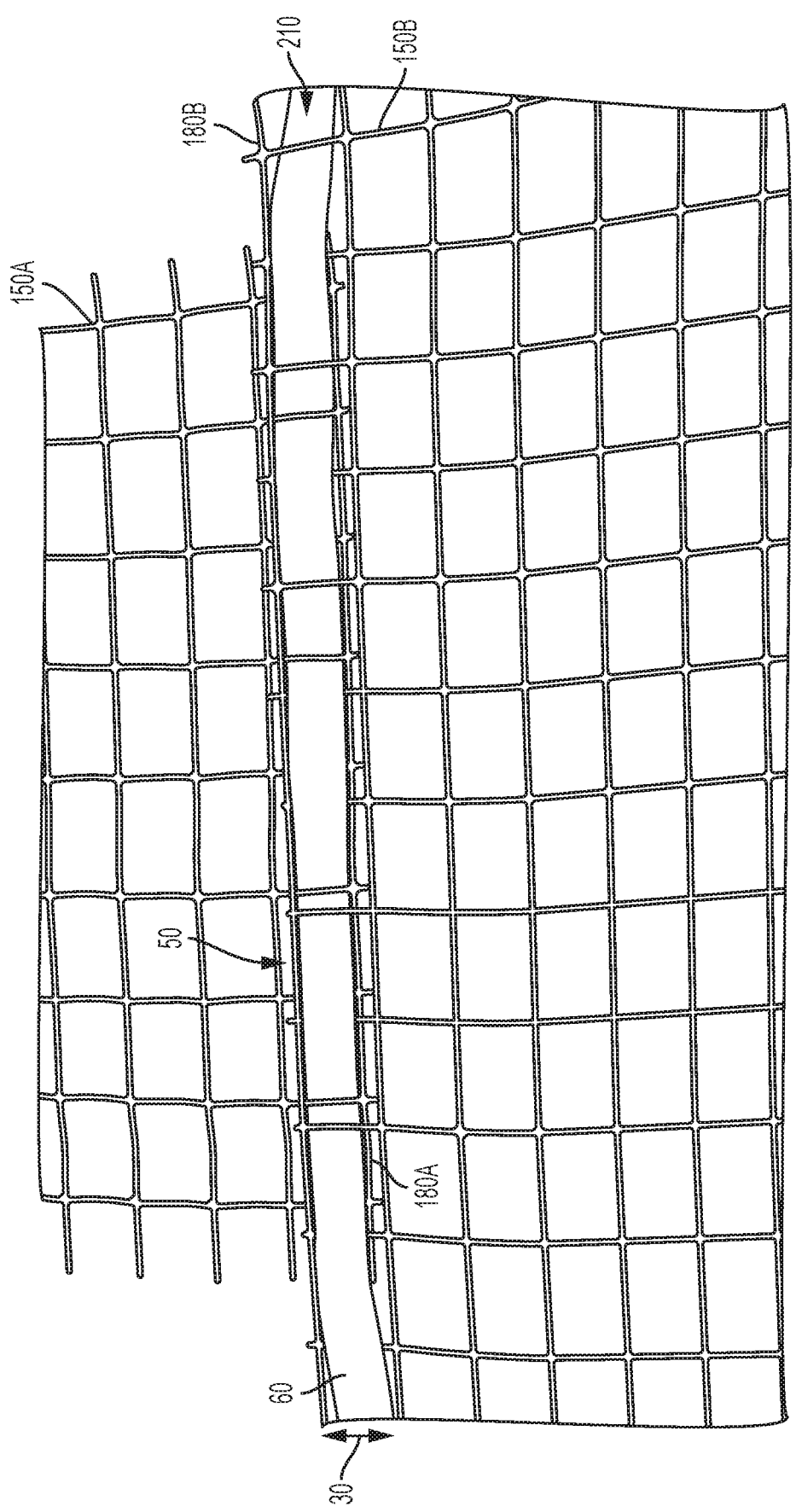
FIG. 4 is a top view of adjacent, overlapping panels having straight boundaries and woven with webbing material according to some embodiments of the present disclosure.

There are many products available in the realm of outdoor recreation that provide a highly stable and strong structural skeleton, typically used to support a covering that is windproof, rainproof, and protective against the sun and/or insects. According to some embodiments, these skeletons provide an ideal support for creating an enclosure to exclude deer and other animals from a garden.

One challenge is in joining pieces of deer netting together in shapes to conform to the shape of the skeleton. Deer netting cannot be sewn because the needle piercing the threads of the mesh will weaken the netting and possibly create holes. Netting that is easily sewn, such as mosquito netting, is not strong enough to exclude deer, and also excludes pollinators, which are necessary for some types of vegetables and fruit.

The present disclosure describes systems for enclosures that conform to the shape of recreational and other structural skeletons, including systems for protecting plants or a garden area from unwanted animal pests such as deer.

1. Netting Enclosure

An exemplary netting enclosure 100 of the present disclosure is shown in FIG. 1. The netting enclosure 100 includes a plurality of panels 150 joined to form the netting enclosure 100. Netting enclosure 100 is placed external to or may otherwise be associated with a skeleton or frame 200. In some embodiments, the netting enclosure includes at least one panel 150 that is at least one side portion 160, and optionally includes at least one panel 150 that is at least one top portion 170. The number of panels 150 of netting enclosure 100 varies according to the size and configuration of frame 200. In some embodiments, the panel forming the top portion 170 has the same dimensions as the panel that forms the side portion 160, while in other embodiments the panels are of different dimensions.

Panel 150, also referred to as mesh 150 herein, is a network of material, in other words, a group or system of interconnected material. In some embodiments of the present disclosure, panel 150 is rectangular in shape; in other words panel 150 has straight boundary 180 disposed at about 90 degrees from adjacent boundary 185 as shown in FIG. 2. In other embodiments, as shown in FIG. 7, panel 550 is irregular in shape and includes boundary 190 which is at an angle of other than about 90 degrees from adjacent boundary 195, which may be straight or irregular. Irregular boundary 190 is also referred to interchangeably herein as zigzag boundary 190 (also shown in FIG. 6). In some embodiments, panel 150 includes at least one straight boundary 180 and a least one irregular boundary 190. In other embodiments, panel 150 includes a combination of two or more boundaries chosen from at least one straight boundary 180 and at least one irregular boundary 190, or combinations thereof. In other embodiments, panel 150 includes all straight boundaries 180. In yet other embodiments, panel 150 includes all irregular boundaries 190.

Referring again to FIG. 2, panel or mesh 150 includes a plurality of open cells 10, which are repeated in two directions, the mesh having a mesh size 20, including a mesh width 25 and a mesh height 30. Panel 150 also has a mesh shape. While FIG. 2 shows mesh having a generally square or rectangular shape, other mesh shapes for the mesh 150 include circular, hexagonal as illustrated in FIG. 3, or octagonal. Cells 10 include side walls 40 and openings 50, the openings having a size and shape consistent with the mesh size and shape. Openings 50 should be large enough to let pollinators access into the netting enclosure but small enough to discourage animal pests from entering the netting enclosure. Openings 50 are of sufficient size to accommodate webbing material 60, as shown in FIG. 4, to pass through. Webbing material 60 is used for joining adjacent panels 150A and 150B at seam 210 by weaving, winding, zigzagging, looping, braiding, intertwining, or otherwise interconnecting. FIG. 4 shows webbing 60 weaving in and out of openings 50 of cells 10 from first panel 150A to interconnect alternately with openings 50 of cells 10 of a second panel 150B. A portion of panel 150A overlaps a portion of panel 150B, and the overlapping portions each include a plurality of cells encompassing openings. As shown in FIG. 4, the overlapping portions include at least one cell height 30 from each panel 150A and 150B. The boundary 180A of panel 150A overlaps at least about one cell opening width with the boundary 180B of panel 150B.

Openings 50, as shown in FIG. 2 and as referred to above, have dimensions width 25 and height 30. Alternatively in other embodiments of the present disclosure, openings 50 have a diameter. Generally, any of the dimensions of openings 50, i.e. width, height, and/or diameter, range from about 0.75" to about 3". In some embodiments, openings 50 are about 1.75" in width and about 2" in height. Any opening that is a suitable size to prevent deer from penetrating netting enclosure 100 is sufficient. Cell openings 50 may be varied in size, for example, proximate to a perimeter or lower boundary of the panel (for example smaller openings) in order to deter smaller animal pests such as rabbits.

In some embodiments of the present disclosure, the plurality of panels or mesh 150 comprise plastic or polymer materials such as, but not limited to, commercially available polypropylene mesh. Any durable netting is also suitable for use. Commercially available deer netting typically available in rolls is also suitable for use, from which panels 150 may be selected, sized, and/or cut from these rolls. In other embodiments, the plurality of panels or mesh 150 is made of metal. Advantageously, interconnected panels of metal are useful for garden enclosures, and additionally as contemplated for domestic animal enclosures, where the metal netting can protect domestic animals within the enclosure from predators exterior to the enclosure.

Figure 11:
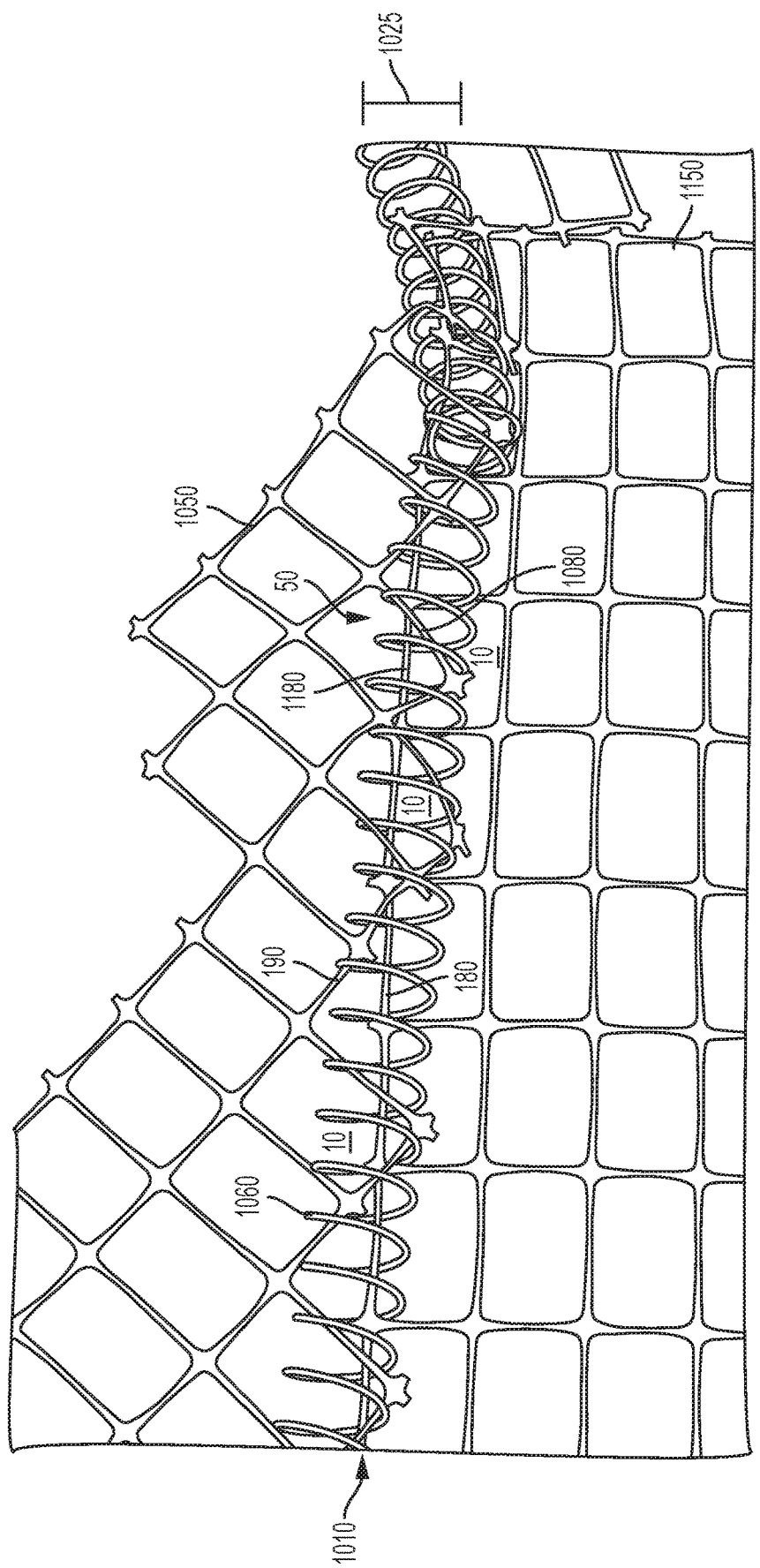
FIG. 11 is a top view of adjacent panels, one having a straight boundary and the other having an irregular boundary, and wound with a coil according to some embodiments of the present disclosure.

Any material suitable for outdoor use, that is known to be light, strong, and water resistant, is useful as webbing material 60. Materials for webbing 60 include nylon, polypropylene, polyethylene, Dyneema® (Ultra-high-molecular-weight polyethylene), Kevlar® (Poly-paraphenylene terephthalamide), polyester, plastic, elastic, canvas, cotton, flax, tape, and hook and loop tape in non-limiting examples. Webbing material or webbing, as referred to interchangeably herein, may be flat strips or tubular; webbing of the present disclosure also broadly includes rope or coil. A coil, as shown in FIG. 11, made of metal or plastic, e.g. polyethylene, or a polyethylene spiral wire wrap, is also suitable for joining adjacent panels 150. The coil may be wound through the cell openings 50.

In some embodiments, frame 200 is a canopy frame available commercially in various standard sizes. In other embodiments, frame 200 is a tent frame or steel frame tunnel. In yet other embodiments, frame 200 is constructed of rebar or reinforcing steel posts or the like. Frame 200 is interchangeably referred to herein as skeleton, canopy, or tent frame. In some embodiments, the frame is a skeleton configured to operate in a plurality of configurations between a first, partially expanded configuration and a second, fully expanded configuration.

2. Adjoining Panels

Figure 5:
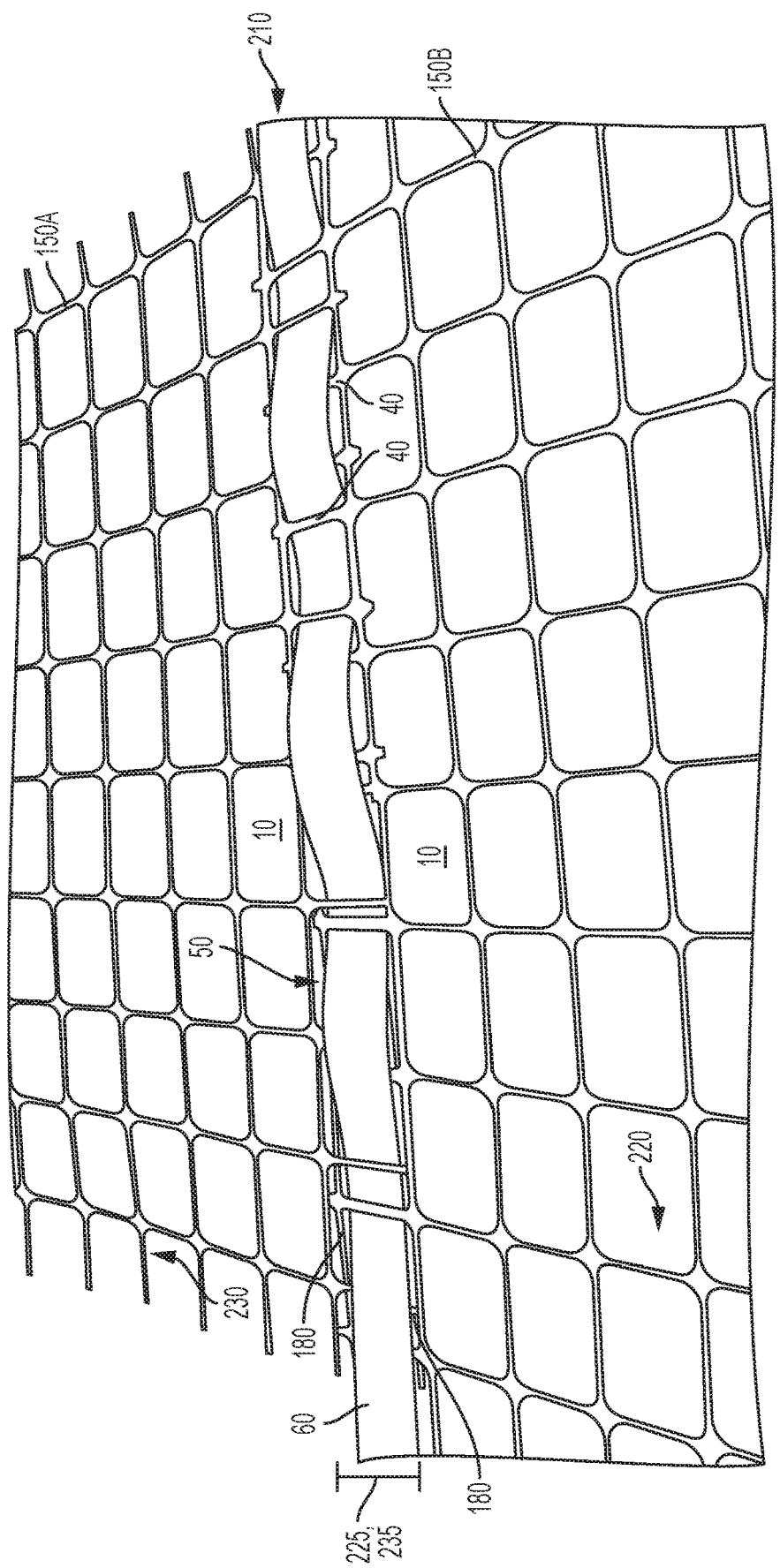
FIG. 5 is a perspective view of the embodiment of FIG. 4.

As shown in FIG. 5, which is a perspective view of adjacent panels according to an exemplary embodiment of the present disclosure, panel 150A is adjoined to panel 150B to provide a seam 210. Panel 150A and 150B may be two independent panels or a single panel extended and/or rolled to expose two boundaries 180 for joining. For example, panel 150A and panel 150B are each of one piece construction with a first face 220 (top face) and a second face opposite the first face 230 (bottom face). At least a portion 225 of the first face 220 is in contact with and/or overlapping with at least a portion 235 of the second face 230. Portions 225 and 235 are, in some embodiments, overlapping with at least some openings 10 aligned for weaving webbing 60 there through. In other embodiments, more than one panel may be used and alternating first and second overlapping portions of different panels adjoined. As shown in FIG. 5, first portion 225 and second portion 235 each include cells 10 having openings 50. Webbing 60 passes through openings 50 weaving over and under walls 40 of cells 10 from 150A and 150B portions 225 and 235, respectively.

Figure 6:
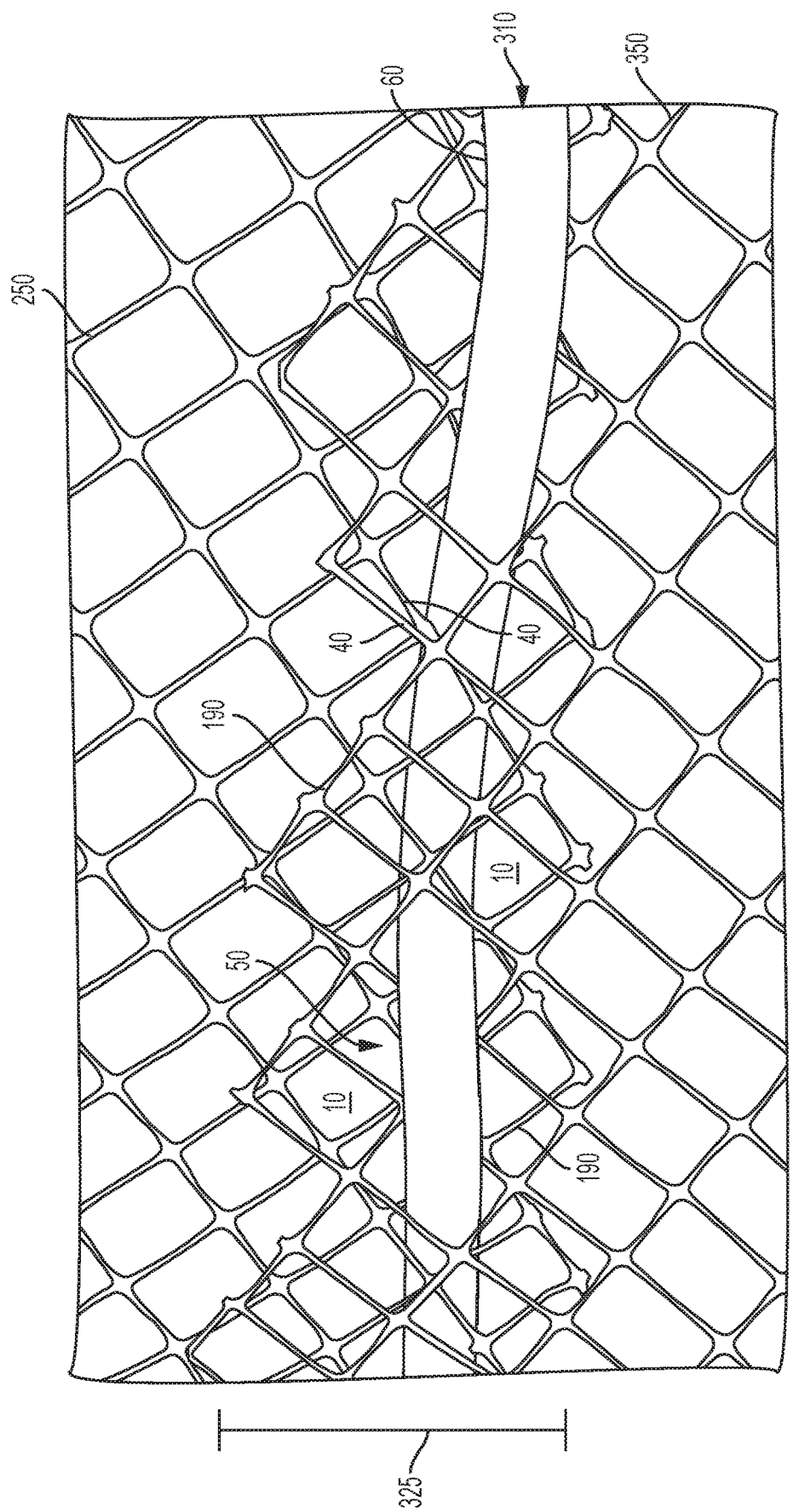
FIG. 6 is a top view of adjacent, overlapping panels having irregular boundaries and woven with webbing material according to some embodiments of the present disclosure.
Figure 7:
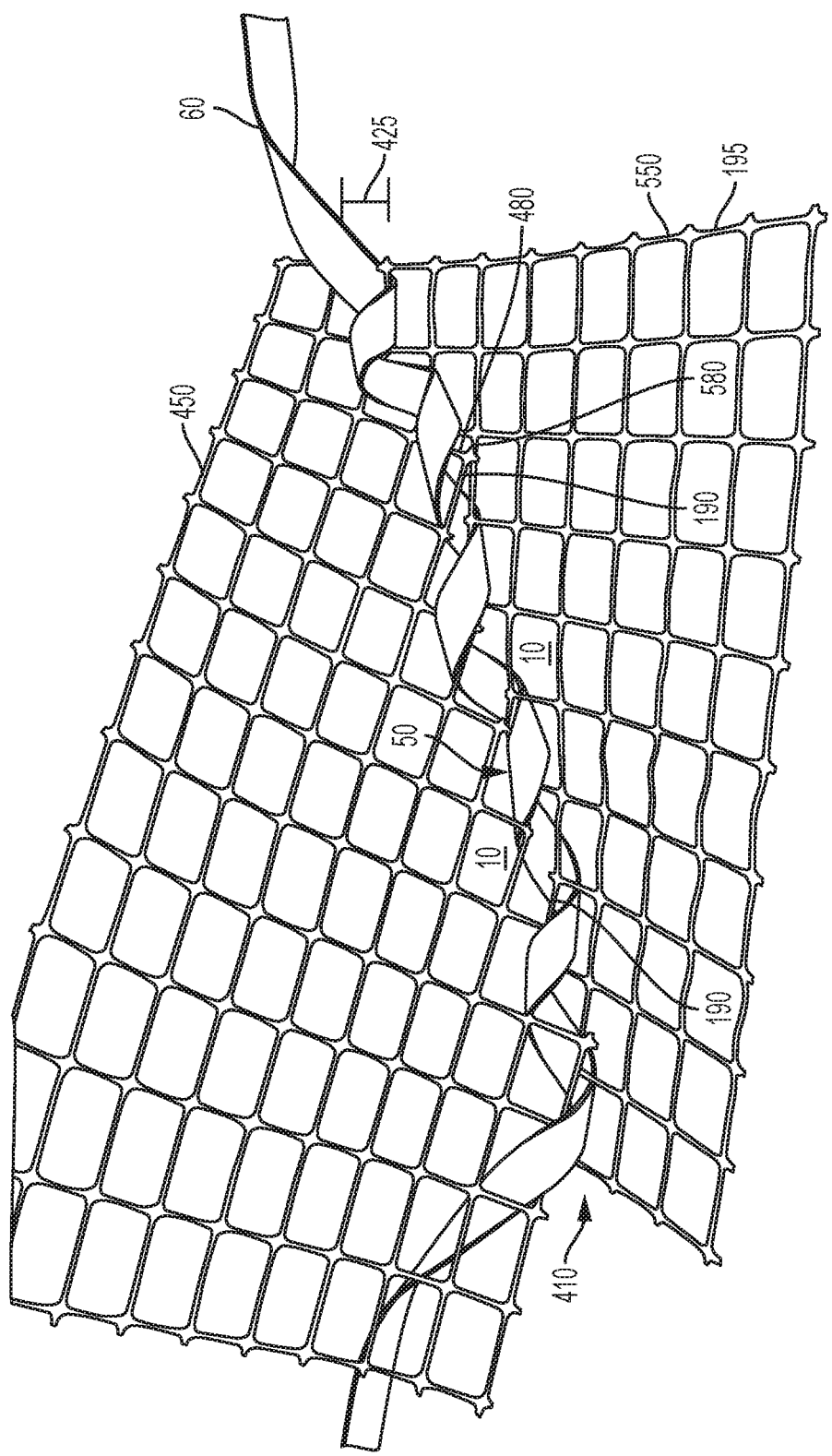
FIG. 7 is a top view of adjacent panels having irregular boundaries and looped with webbing material according to some embodiments of the present disclosure.

FIG. 6 shows joining panels having irregular boundaries 190. Overlapping portion 325, wherein a portion of panel 250 overlaps a portion of panel 350, includes at least a portion of openings 50 of panel 250 are aligned with at least a portion of openings 50 of panel 350, the aligned openings configured to receive webbing material 60. Webbing material 60 is woven through or otherwise intertwined through openings 50 to adjoin panels 250 and 350 to provide seam 310. Seams 210 of FIG. 5 and 310 of FIG. 6 are rigid seams having limited flexibility thus providing structure and support to netting enclosure 100. Webbing material 60 is wefted through, in other words drawn over-and-under, aligned openings 50 of cells 10 from panels 250 and 350.

Figure 8:
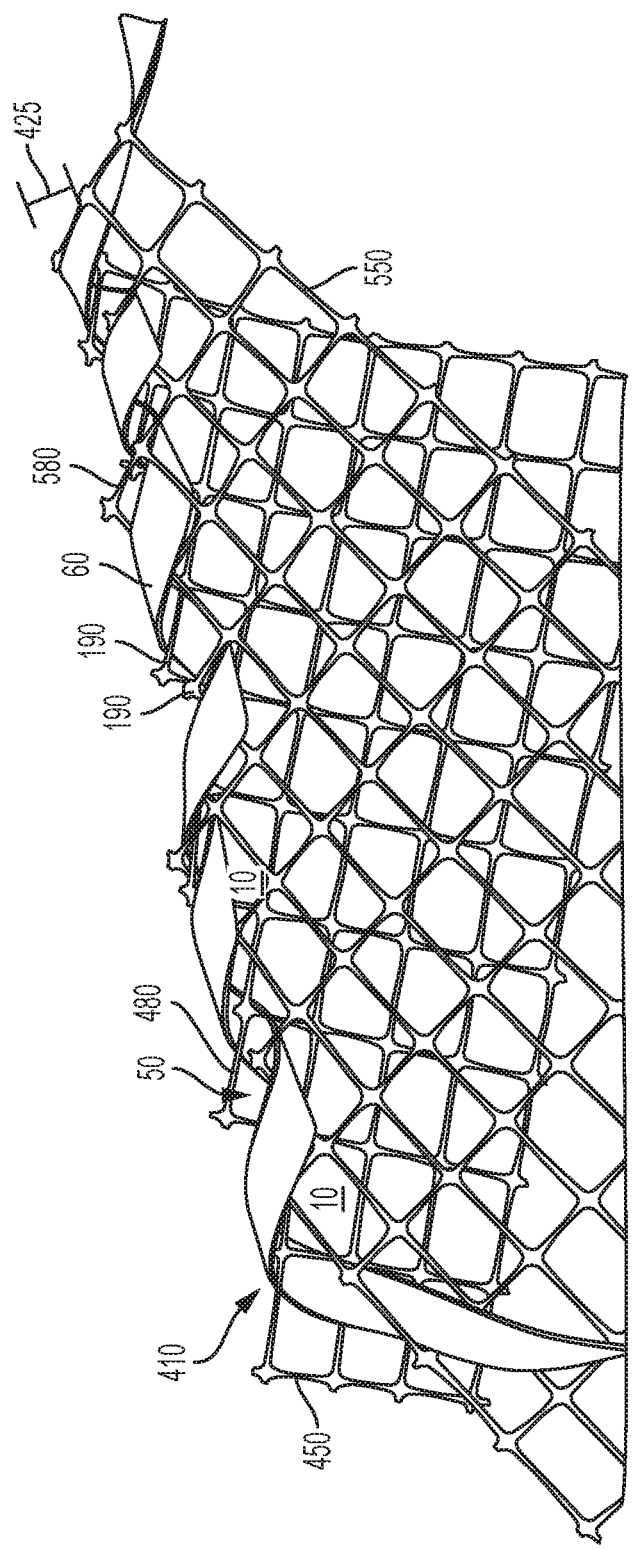
FIG. 8 is a view of adjacent panels having irregular boundaries and looped with webbing material to form a foldable seam according to some embodiments of the present disclosure.

FIG. 7 illustrates an alternative embodiment of the present disclosure showing at least one panel joined by webbing material 60 to form seam 410. As previously detailed, joining may be of two boundaries within the same panel or two boundaries from separate panels. Panels 450 and 550 are joined by looping webbing 60 through adjacent panels having irregular boundaries 190. In some embodiments, the panels may have straight boundaries. The panels are generally imbricated, having adjacent edges aligned and may slightly overlap, in order to join the panels so that the seam 410 is flexible and that the panels may be folded together if needed. Portion 425 includes the area in which an edge portion 480 of panel 450 is generally aligned with edge portion 580 of panel 550. Webbing 60 is looped through an opening 10 of panel 450 alternately with an opening 10 of panel 550. FIG. 8 is yet another view of the embodiment of FIG. 7 including looping to adjoin panels 450 and 550, showing further that the panels are foldable.

Figure 9:
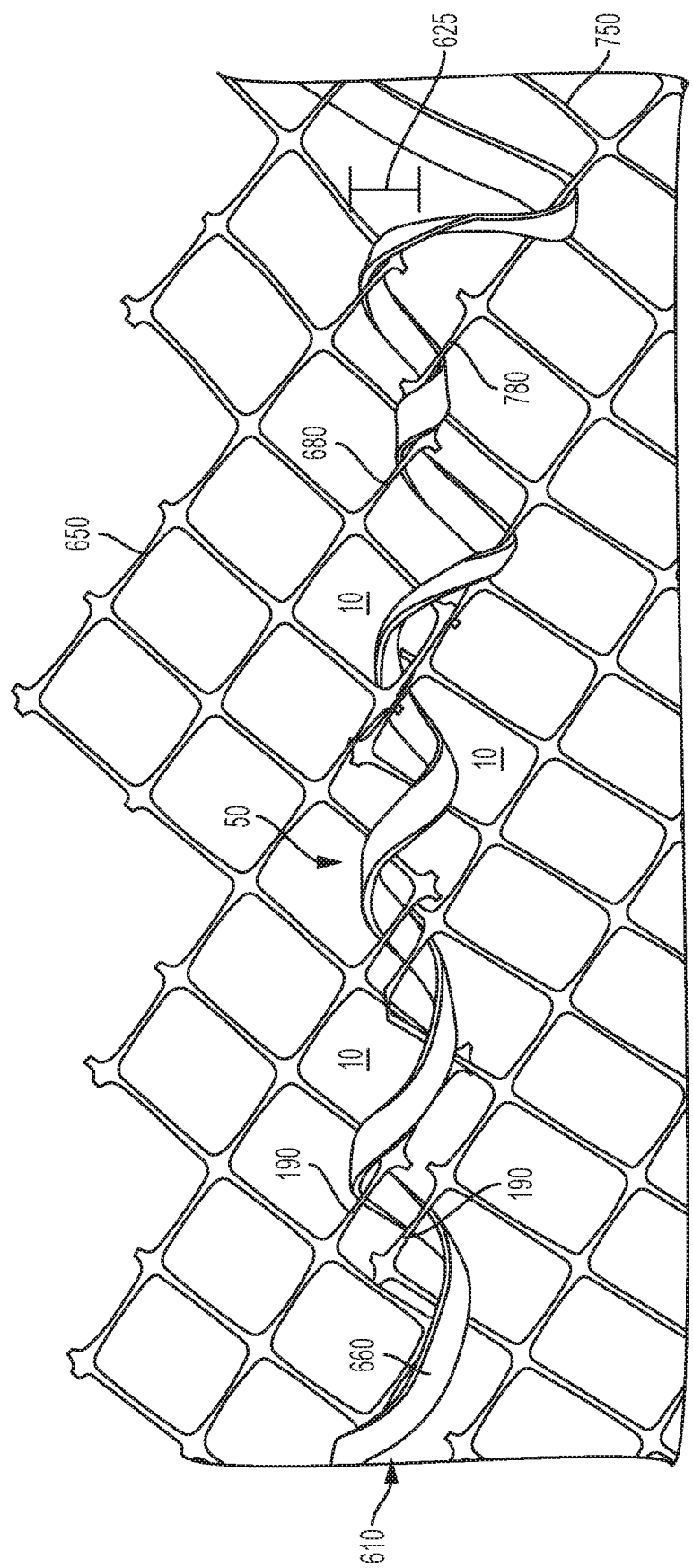
FIG. 9 is a top view of adjacent panels having irregular boundaries and looped with another webbing material according to some embodiments of the present disclosure.

FIG. 9 illustrates another alternative embodiment of the present disclosure showing at least one panel joined by webbing material 660 to form seam 610. As previously detailed, joining may be of two boundaries within the same panel or two boundaries from separate panels. Panels 650 and 750 are joined by looping webbing 660 through adjacent panels having irregular boundaries 190. The panels are generally imbricated, having adjacent edges aligned and may slightly overlap, in order to join the panels so that the seam 610 is flexible and that the panels may be folded together if needed. Portion 625 includes the area in which an edge portion 680 of panel 650 is generally aligned with edge portion 780 of panel 750. Webbing 660 is looped through an opening 10 of panel 650 alternately with an opening 10 of panel 750.

Figure 10:
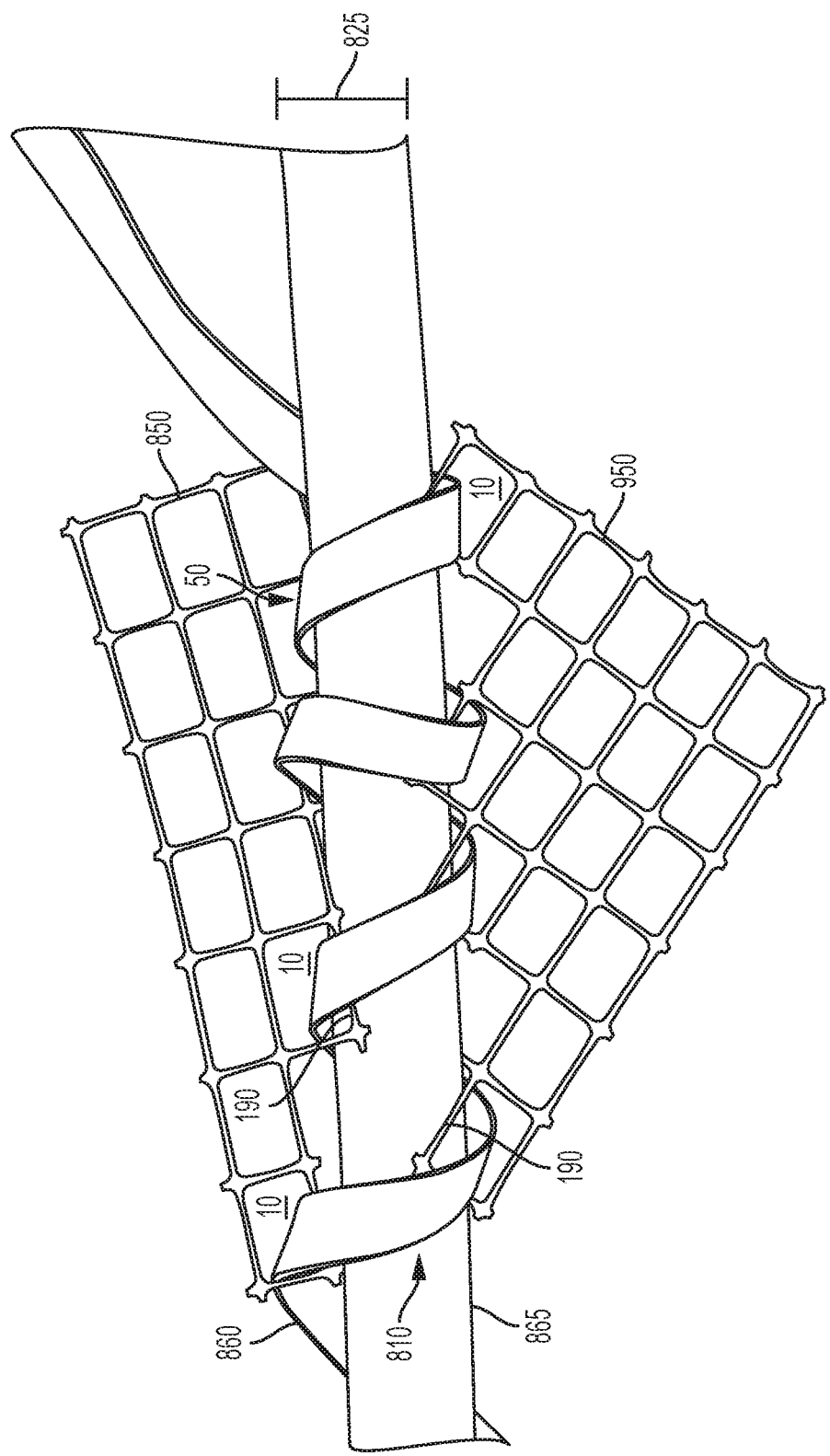
FIG. 10 is a top view of adjacent panels having irregular boundaries and looped with webbing material and further including a reinforcing strap according to some embodiments of the present disclosure.

FIG. 10 illustrates yet another embodiment of the present disclosures showing at least one panel joined by webbing material 860 to form seam 810. Further included is reinforcing strap 865. Reinforcing strap 865 is made of the same or different weather resistant material as the webbing. Strap 865 has a width that is at least at wide as webbing material 860. As shown in non-limiting example of FIG. 10, strap 865 is wider than webbing material 860. Panels 850 and 950 are joined by looping webbing 860 through adjacent panels having irregular boundaries 190. Alternatively in other embodiments, each panel for joining has a straight boundary or a combination wherein one panel has a straight boundary and the other panel has an irregular boundary. Adjacent edges are aligned and may slightly overlap, in order to join the panels so that the seam 810 is flexible and that the panels may be folded together if needed. Portion 825 includes the area in which an edge portion of panel 850 is generally aligned with edge portion of panel 950. Webbing 860 is looped through an opening 10 of panel 850 alternately with an opening 10 of panel 950. The embodiment as shown in FIG. 10 is suitable for roofing panels or top portions 170 of netting enclosure 100 that may require further structure or support. Straps 865 may be advantageously aligned with frame supports to give added structure or support to top or side portions of netting enclosure 100.

FIG. 11 illustrates another embodiment of the present disclosures showing at least one panel joined by webbing material or coil 1060 to form seam 1010. Panels 1050 and 1150 are joined by looping coil 1060 through adjacent panels having straight boundaries 180 or irregular boundaries 190 or both. In some embodiments, the panels have all straight boundaries or all irregular boundaries. Seam 1010 is flexible and the panels are foldable as needed to conform to a frame for example or for storage. Coil 1010 is expandable and panels 1050 and 1150 are therefore stretchable relative to one another in order to adjust and adapt to varying sizes of structures or frames. Portion 1025 includes the area in which an edge portion 1080 of panel 1050 is generally aligned with edge portion 1180 of panel 1150. Webbing 1060 is looped through an opening 10 of panel 1050 alternately with an opening 10 of panel 1150.

Figure 12:
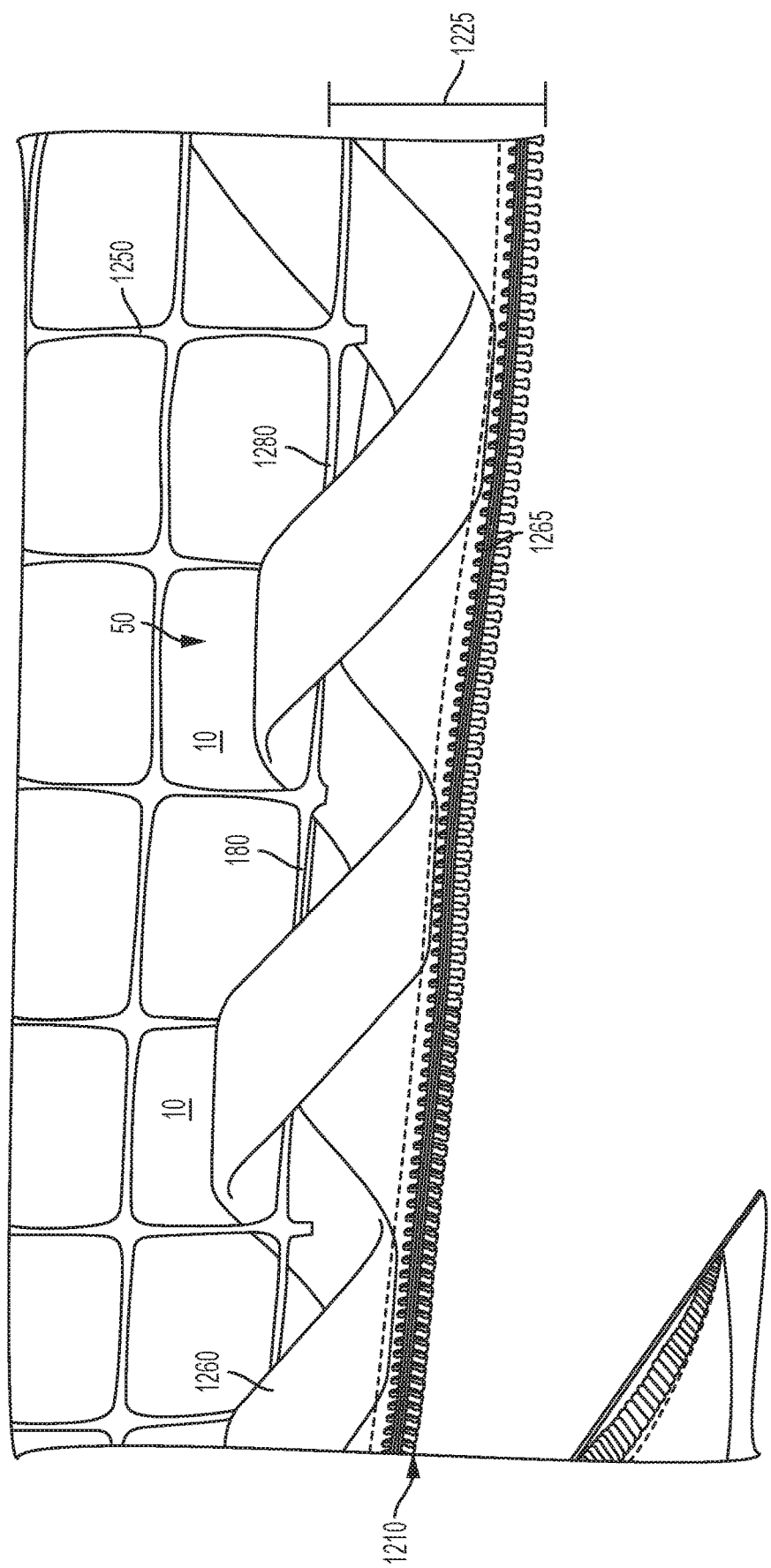
FIG. 12 is a top view of a panel connected to a fastener according to some embodiments of the present disclosure.

As shown in FIG. 12, and in some embodiments according to the present disclosure, webbing material 1260 is further woven, looped, or otherwise connected to at least one panel and also to a fastening mechanism. Webbing 1260 is looped through at least one edge portion 1280 of panel 1250 having boundary 180. Webbing 1260 is further connected or configured for attachment with fastener 1265. In some embodiments, fastener 1265 is a zipper. Portion 1225 shows the area of attachment of webbing 1260 to panel 1250 and zipper 1265. Although not shown, it is understood by those skilled in the art that another panel edge portion is connected to a second webbing material 1260 and the zipper 1265. The zipper forms an openable and closeable seam 1210.

Figure 13:
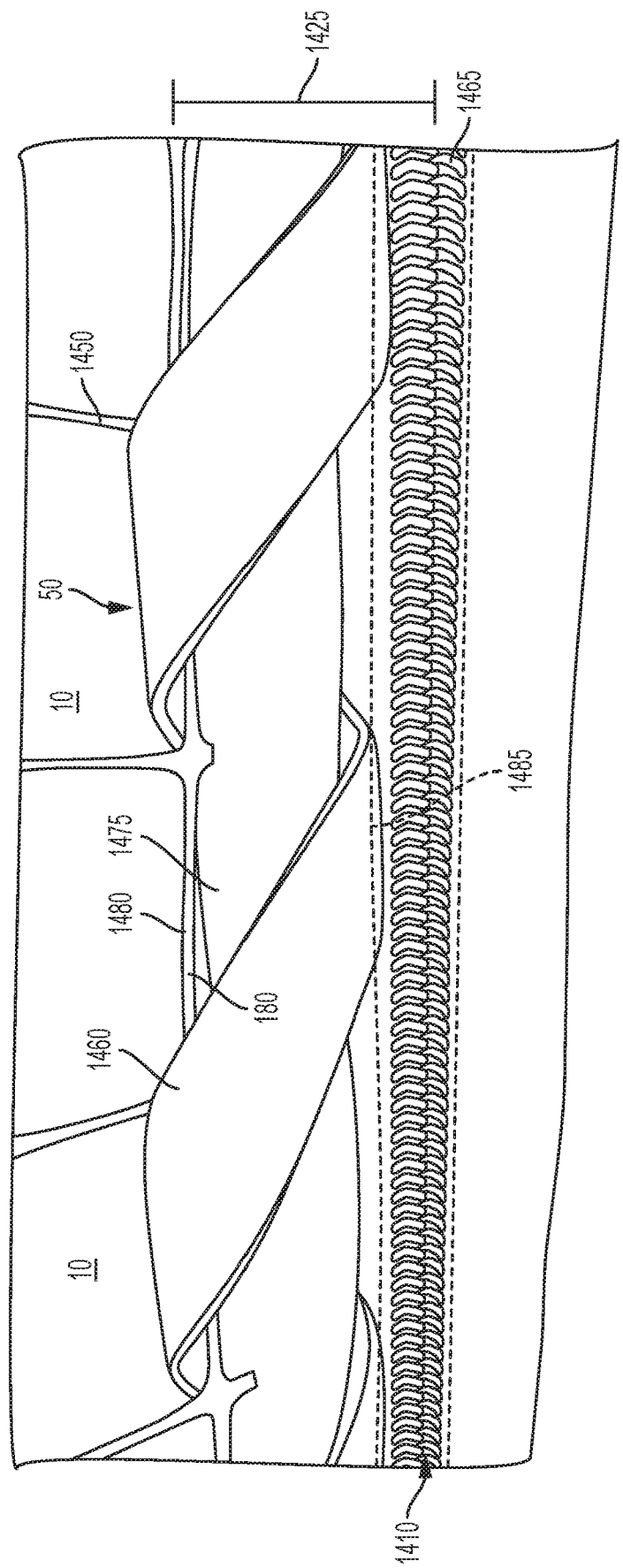
FIG. 13 is a top view of a panel connected to a fastener and further including a spacer strap according to some embodiments of the present disclosure.

As shown in FIG. 13, and in some embodiments according to the present disclosure, webbing material 1460 is further woven, looped, or otherwise connected to at least one panel 1450 and around a strap 1475 parallel to the edge 1480. The outer edge of webbing material 1460 is stitched to fastening mechanism 1465, with strap 1475 holding the shape, thus attaching fastening mechanism 1465 to the panel 1450 at stitching 1485. As shown in FIG. 13, webbing 1460 is looped through at least one edge portion 1480 of panel 1450 having boundary 180. Webbing 1460 is further connected or configured for attachment with fastener 1465. In some embodiments, fastener 1465 is a zipper. Portion 1425 shows the area of attachment of webbing 1460 to panel 1450 and zipper 1465. Although not shown, it is understood by those skilled in the art that another panel edge portion is connected to a second webbing material 1460 and zipper the 1465. The zipper forms an openable and closeable seam 1410. The strap 1475 provides spacing and reinforcement to the zipper seam 1410 and is easily removable if desired. FIG. 13 shows attachment of the fastener.

3. Netting Kit

According to methods of the present disclosure, linear and nonlinear shapes are joinable to form an enclosure for preventing animal entry or disturbance of a garden or plant. In an alternative use, the netting enclosure of the present disclosure is used for preventing a domestic animal residing within the enclosure from leaving the enclosure or from being disturbed by animals outside of the enclosure. Advantageously, netting enclosure 100 including a plurality of panels 150 is useful with or installable onto commercially available products. These commercially available products include, for example, outdoor recreational products that provide a covered or enclosed space as protection against the elements such as tents in which to sleep, shelters under which to seek protection against sun or rain, and shelters with netting to protect against mosquitos and other bothersome insects. Such products, specifically a frame devoid of covering, are useful as frames, canopies, skeletons, or structures for netting enclosure 100 due to durability, stability (against wind for example), and strength. Furthermore, such products are available in a wide variety of sizes and shapes. Adapting the structural skeleton as support for the netting enclosure of the present disclosure provides exclusion of deer from a garden. Adjoined panels as in aforementioned embodiments according to the present disclosure solve the problem of joining rectangular or non-rectangular pieces of deer netting together in linear or non-linear shapes to conform to the shape of the recreational structure skeleton. Deer netting cannot be readily sewn due to thickness and strength, and because the needle piercing the side walls or threads of the mesh will weaken the netting, potentially creating holes. Netting that is easily sewn, such as mosquito netting, is not strong enough to exclude deer, and also excludes pollinators, which are necessary for some types of vegetables and fruit. Netting enclosures according to the present disclosure are conformable to the shape of recreational and other structural skeletons.

Figure 14:
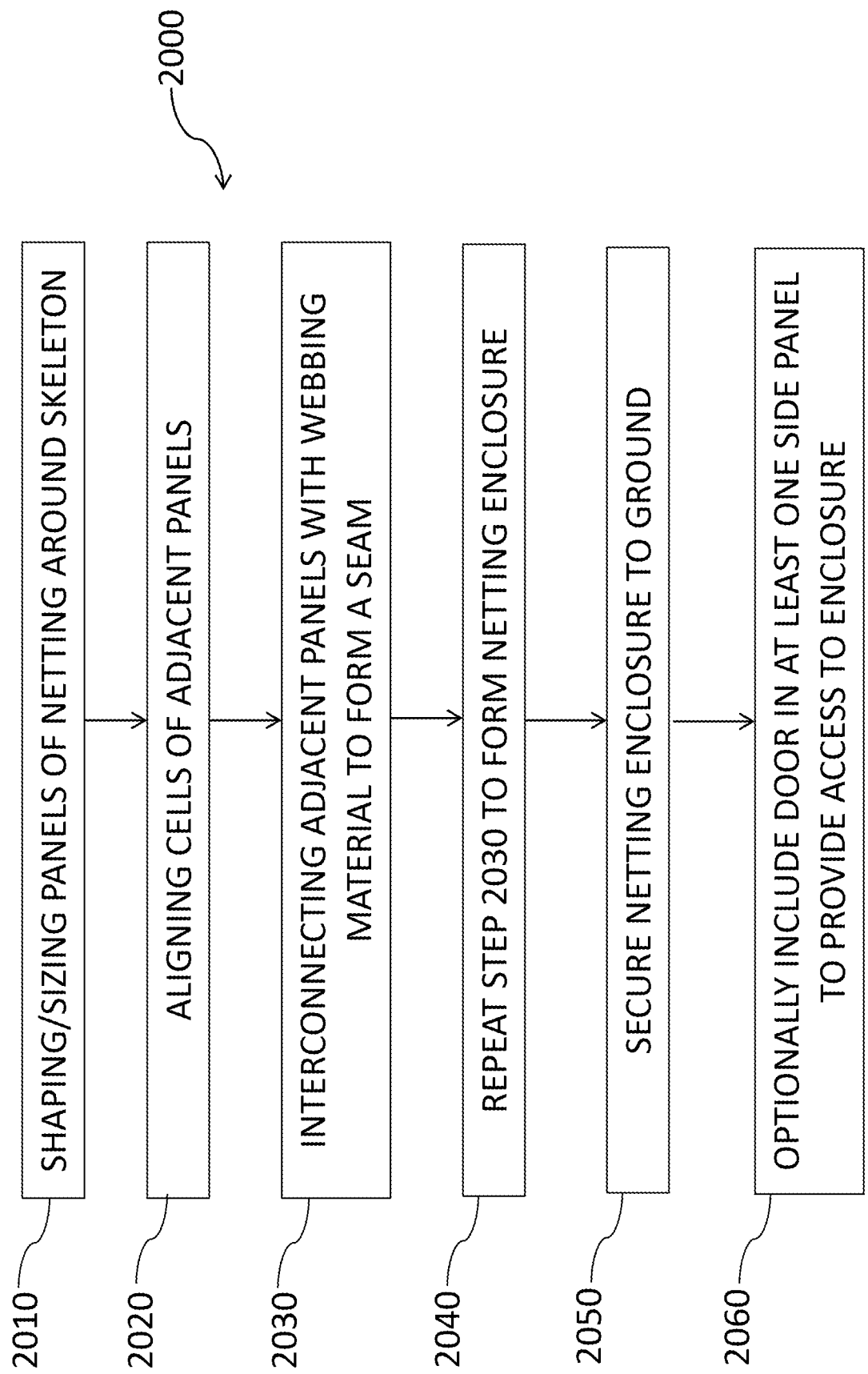
FIG. 14 is a flow chart illustrating a method of the present disclosure of making a netting enclosure.

FIG. 14 is a flow chart illustrating a method according to the present disclosure. Method 2000 includes shaping and sizing panels of netting to fit desired skeleton dimensions in step 2010. Sizing and shaping includes selecting panels according to size or cutting panels to desired shape and size. Panels are cut parallel to the cells, or alternatively diagonally or in zigzag fashion. In some embodiments, panels are provided pre-sized or, alternatively, cut to size and shape to fit desired structure skeleton or frame. Advantageously, the panels are cuttable in irregular shapes to fit to any skeleton or frame. Step 2020 includes aligning cells of adjacent panels. In some embodiments, a portion of a first panel overlaps with a portion of a second panel. Each panel includes a boundary that overlaps to include a first face portion of one panel facing a second face portion of a second panel. At least a portion of the cells of each of the first and second face portions are aligned and configured to receive webbing material woven there through to provide a seam, which may be rigid. In other embodiments, step 2020 includes an edge portion of a first panel positioned adjacent to an edge portion of a second panel. The edge portions are positioned adjacently with minimal or no overlap and configured to receive webbing material looped from cells of a first panel alternately with cells of a second panel to provide adjoined panels having a seam that is foldable.

Step 2030 includes interconnecting adjacent panels with webbing material or coil to form a seam. As described in various embodiments above, at least two overlapping portions of panels to be adjoined are overlapped or at least two edge portions of panels are positioned adjacently to accommodate weaving or looping of a webbing material from cells of a first panel to cells of a second panel. An interconnected panel according to the present disclosure provides a seam. Advantageously, any stresses to the netting enclosure, such as a large animal pushing against it, are distributed along the length of the seam, rather than being focused on a particular area of the join. Panels are interconnected according to step 2030, repeated as needed according to step 2040, to form a netting enclosure. Optionally in step 2040 roofing and/or floor panel(s) are included and adjoined to the plurality of panels as desired.

Method 2000 further includes placing the enclosure onto a skeleton or frame and securing the netting enclosure, according to step 2050, to the ground using landscaping staples or other means as known in the art, such as stakes holding the webbing down at the corners. Step 2060 optionally includes providing an entrance to the netting enclosure by overlapping the panels or providing an access door. The gardener can access the garden simply by removing the landscape staples at an overlap. Alternatively, zipper panels are included to provide an access door into the netting enclosure. In some embodiments of the method, the step of aligning cells of adjacent panels includes overlapping a first portion of a first panel with a second portion of a second panel. In some embodiments of the method, the step of aligning cells of adjacent panels includes positioning a first plurality of cells of a first panel adjacently to a second plurality of cells of a second panel. In some embodiments of the method, the webbing material is a strap or a coil, and wherein interconnecting adjacent panels with the webbing material includes weaving the webbing material alternately through cells in adjacent panels. In some embodiments, the method further comprises installing a fastening mechanism at a seam of at least one of the interconnecting adjacent panels, the seam configured to be openable and closeable. In some embodiments, the method further comprises installing the netting enclosure onto a skeleton without using the webbing material interconnecting adjacent panels.

In some embodiments according to the present disclosure, a netting kit comprises: a skeleton configured to operate in a plurality of configurations between a first, partially expanded configuration and a second, fully expanded configuration; a netting enclosure comprising a plurality of panels configured to be joined together to enclose or hang from the skeleton in each of the plurality of configurations; a first webbing configured to connect to a first portion of the netting enclosure; a second webbing configured to connect to a second portion of the netting enclosure; and a fastener configured to be attached to the first webbing and to the second webbing to form an openable and closeable seam. In some embodiments, the skeleton is changeable in shape between the partially expanded configuration and the fully expanded configuration. In some embodiments, the plurality of panels includes a third panel configured to overlap a fourth panel, the netting kit further comprising a third webbing configured to secure the third panel to the fourth panel by weaving in and out of cells in the third panel and the fourth panel. In some embodiments, the third webbing is configured to flexibly secure the third panel to the fourth panel without creating openings that permit animal access. In this manner, the panels can be secured to adjacent panels. In some embodiments, at least one of the plurality of panels is configured to prohibit burrowing animals. In some embodiments, the plurality of panels are joined together into two separate sections: a first section in which a first panel is orthogonally joined to two other panels and a second section in which at least two panels are orthogonally joined together, wherein the first section and the second section are configured to be joined together to enclose or hang from the skeleton. In some embodiments, the skeleton is configured to operate in the fully expanded configuration without sinking posts into the ground.

In some embodiments according to the present disclosure, a netting enclosure for preventing deer access comprises: a plurality of panels each having a first face, a second face opposite the first face, and a plurality of cells encompassing openings connecting the first face and the second face, the plurality of cells sized to enable pollinator access while prohibiting access to deer; and at least one webbing material configured to join at least two adjacent panels together by alternately interconnecting cells of the adjacent panels to form a seam that prevents deer access between the adjacent panels. In some embodiments, at least a first panel, a second panel, and a third panel of the plurality of panels are joined together in a predefined configuration in which the first face of the first panel lies is a first plane, the first face of the second panel lies in a second plane substantially orthogonal to the first plane, and the first face of the third panel lies in a third plane substantially orthogonal to the second plane, and wherein the at least one webbing material is configured to join at least one of the first panel, the second panel, and the third panel to a fourth panel by alternately interconnecting cells of the panels to form the seam that prevents deer access. That webbing material may be hook and loop tape. In some embodiments, the plurality of panels includes a first panel having a first boundary and a second panel having a second boundary, wherein a portion of the first panel is configured to overlap a portion of the second panel, with the overlapping portions each including at least a portion of the cells. In some embodiments, the first boundary and the second boundary overlap to align at least a portion of the cells of the first panel with at least a portion of the cells of the second panels, the webbing material configured to weave through the aligned cells of the first and second panels to form a rigid seam. In some embodiments, the plurality of panels includes a first panel having a first edge portion and a second panel having a second edge portion, each edge portion including a plurality of the cells, the webbing material being configured to interconnect adjacent edge portions to form a foldable seam. In some embodiments, at least one of the plurality of panels includes a fastening mechanism configured to create a seam that is openable and closeable. In some embodiments, the at least one webbing material is configured to join two adjacent panel portions together by alternately interconnecting cells of the adjacent panel portions to form the seam without a skeletal structural member. For example, in some embodiments, the seams are formed at locations spaced apart from the members of the skeletal structural member by at least one inch.

EXAMPLES

A kit according to the present disclosure includes a netting enclosure pre-cut and joined in such a way as to be easily assembled by the user and installed onto the structural skeleton of a recreational canopy or tent.

Netting Enclosure—Peaked Roof

A roof is made of panels adapted in shape to fit a peaked roof of a skeleton. While the examples herein include a roof constructed of four panels, it is understood by those skilled in the art that the number of panels is variable. Moreover, the roof need not be peaked and may alternatively be flat. The roof is constructed in one of the following ways:

Example 1

Panels were cut to fit each of the four quadrants formed by the roof joists of the canopy, with sufficient material for overlap with the adjacent sections. While four quadrants are detailed here, the number of adjacent sections of roof panels is variable depending upon the size and the configuration of the skeleton. In a non-limiting example, the number of adjacent sections of roof panel ranges from one to about eight, although more panels may be used as needed. The edges of adjacent panels, cut parallel to the thread or at a diagonal as needed, were overlapped. The panels for this example were cut from commercially available deer netting rolls. A weather-resistant webbing material was then woven in and out of the openings of cells of both panels to join the two panels. The same piece of webbing was used to join the two panels that form the opposite corner of the roof. A sufficient length of the webbing material was used to allow for the height of the canopy and the distance across the entire diagonal roof joist so that the webbing material was additionally and advantageously used like guy wires to secure the netting enclosure to the ground. The same method was used to join the roof sections along the remaining diagonal roof joists. A rigid seam suitable for joins that do not need to be folded was created. One side of hook and loop tape was woven in and out of the adjoined panels along the entire perimeter of the roof to allow for the attachment of the side panels.

Example 2

Panels were cut to fit each of the four quadrants formed by the roof joists of the canopy. The edge portions of two panels, cut parallel to the thread or at a diagonal as needed, were positioned adjacently to each other, but with minimal or no overlap of edge portions. The panels for this example were cut from commercially available deer netting rolls. A weather-resistant webbing material was then woven in a diagonal, zig zag manor through the openings of cells of first one panel and then the other panel, alternating back and forth to create a flexible seam. The same piece of webbing was used to join the two panels that form the opposite corner of the roof in the same way. A sufficient length of the webbing material was used to allow for the height of the canopy and the distance across the entire diagonal roof joist so that the webbing material was also additionally and advantageously used like guy wires to secure the netting enclosure to the ground. A flexible seam to allow the netting to be folded at the seam to be put away was created. One side of hook and loop tape was woven in and out of the netting along the entire perimeter of the roof to allow for the attachment of the side panels.

Example 3

Panels were cut to fit each of the four quadrants formed by the roof joists of the canopy. The edge portions of two panels, cut parallel to the thread or at a diagonal as needed, were positioned adjacently to each other. The panels for this example were cut from commercially available deer netting rolls. A coiled material was then wound through the openings of cells of the adjacent panels, first one then the other, alternating back and forth to create a flexible seam. The same piece of coiled material was used to join the two sections of deer netting that form the opposite corner of the roof in the same way. An optional weather-resistant webbing material was additionally passed through the coil to provide a sturdy means for anchoring the structure to the ground. A sufficient length of the webbing material was used to allow for the height of the canopy and the distance across the entire diagonal roof joist so that the webbing material was also additionally and advantageously used like guy wires to secure the netting enclosure to the ground. Foldable, stretchable joins were created in this manner to allow the netting to be folded to be put away. One side of hook and loop tape was woven in and out of the netting along the entire perimeter of the roof to allow for the attachment of the side panels.

For roof structures that are flat rather than peaked, the same procedure as disclosed for sides of the netting enclosure below is applicable.

The sides of the netting enclosure are constructed in one of the following ways:

Example 4

Panels were cut or sized according to the height of the netting enclosure desired. Alternatively, panels are sized with an overage to the height to be used and secured as ground prevention for smaller animals such as rabbits burrowing into or under the netting enclosure. The panels for this example were cut from commercially available deer netting rolls. One side of hook and loop tape was woven in and out of the top edge of the side to allow for the attaching of the side to the roof. The sides were attached to the roof panels using the hook and loop tape with the corner posts of the structure in the middle of each wall section and the side edges of each wall section overlapping the adjacent section. Wherein hook and loop tape was woven throughout the perimeter of the plurality of panels forming a roof, it was the opposite side of the hook and loop tape exposed to the roof's hook and loop tape enabling the tapes to meet and interconnect.

Example 5

Panels were cut or sized according to the height of the netting enclosure desired. One vertical edge of a wall section was placed adjacent to a strip of weather-proof material to facilitate weaving of a weather-resistant webbing material. The weather-resistant webbing material was then woven in a diagonal manor through an opening of a cell in the panel around the strip and then through another opening of a cell at the edge of the panel, advancing along the edge of the netting to attach the strip to the edge of the netting. One side of a zipper was then sewn to the strip. The other side of the zipper was attached in a similar way to another wall panel. One side of hook and loop tape was woven in and out of the top edge of the side to allow for the attaching of the side panel to the roof panel. The side panels were attached to the roof panels using the hook and loop tape with the corner posts of the structure in the middle of each wall section with the zipper entrance in the middle of one of the side panels.

Netting Enclosure—Flat Roof

Example 6

An enclosure in the shape of a cube having a flat top or ceiling panel was sized according to the dimensions of the netting enclosure desired. The cube shaped enclosure utilized two portions, as shown in FIGS. 15A-15C, each portion 1570 and 1580 having three panel pieces 1550 joined together, and the two portions 1570 and 1580 configured to be further joined to form a six-sided cube. The first portion included a ceiling panel 1550c with a side panel 1550 attached on each of two opposite sides using one of the methods as described above to form foldable joins 1575. Webbing strip 1560 was passed through the join parallel to the panel edge and within the webbing or coil used to create the join 1575 to distribute the stress that would otherwise be focused on hang points. One of the side panels included a door for accessing the garden, which was created by either overlapping panels or using a zipper or other fastening mechanism as described above. The second portion 1580 included a floor panel 1550f with a side panel 1550 attached on each of two opposite sides using one of the join methods as described above. The floor panel 1550f may include holes cut in it for allowing planting or raised planter boxes to be placed on top of the floor netting panel. Advantageously, the floor panel 1550f prevents burrowing animals from obtaining entry into the enclosure and access to the plants. The side panels included a webbing or strip 1560 woven through the outermost row of the panel to distribute the stress that would otherwise be focused on the hang points. Hook and loop tape, for example, may be used on joinable panel edges as needed. The cube shape enclosures of Example 6 are suitable for use with frames commercially available, for example, for use with shelters, tents or awnings.

Example 7

Figure 16B:
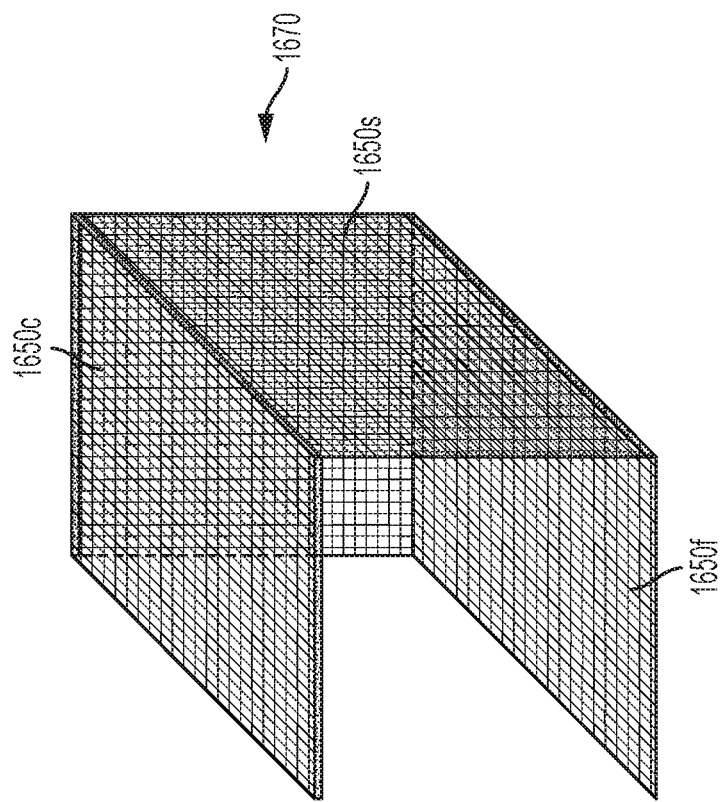
FIG. 16B is a perspective view of a second portion of an enclosure including floor and ceiling panels connected to a side panel for a cube shaped enclosure according to some embodiments of the present disclosure.
Figure 16A:
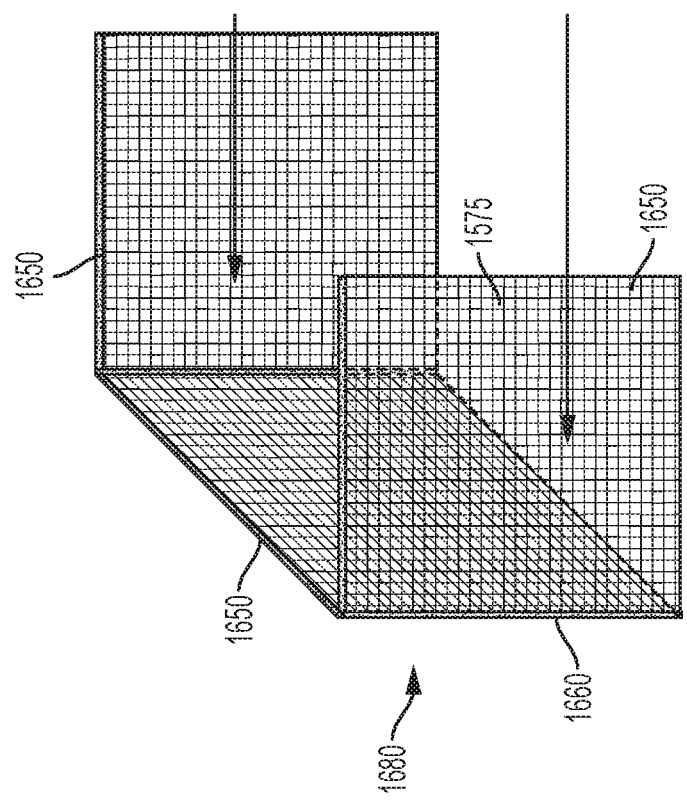
FIG. 16A is a perspective view of a first portion of an enclosure including side panels for a cube shaped enclosure according to some embodiments of the present disclosure.
Figure 17A:
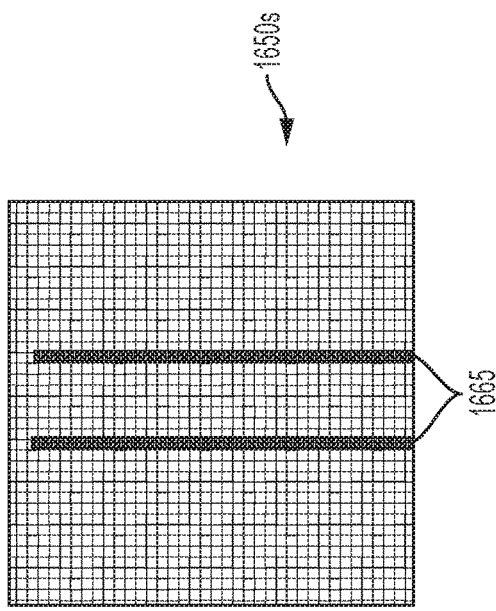
FIG. 17A is a side view of a panel including an access door in a closed position according to some embodiments of the present disclosure.
Figure 17B:
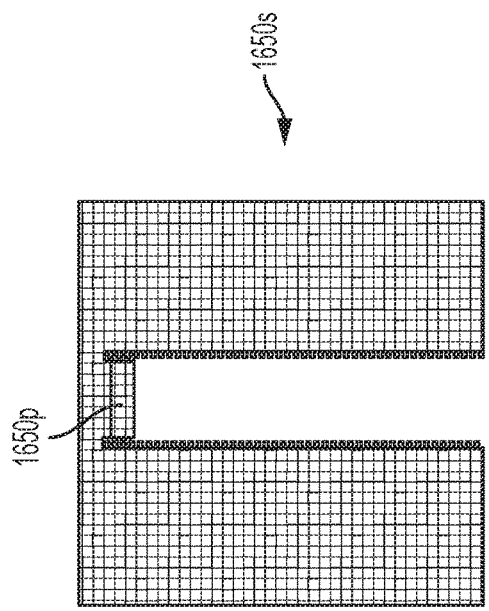
FIG. 17B is a side view of the panel of FIG. 17A including the access door in an open position according to some embodiments of the present disclosure.
Figure 18B:
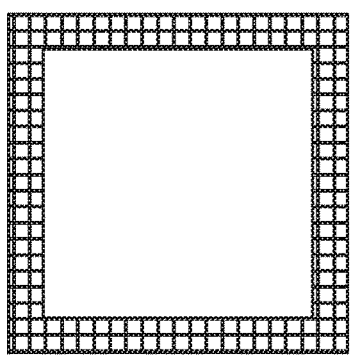
FIG. 18B is a top view of an enclosure having a perimeter of netting and a central opening for an enclosure according to some embodiments of the present disclosure.
Figure 18D:
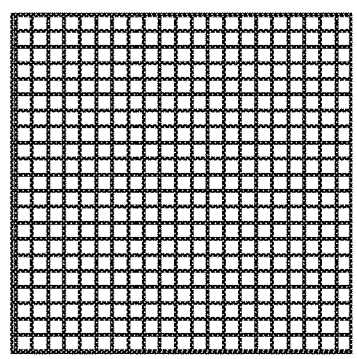
FIG. 18D is a top view of an enclosure having a continuous panel of netting according to some embodiments of the present disclosure.

An alternate cube shaped netting enclosure included two portions 1670 and 1680 as shown in FIGS. 16A and 16B. Side panel 1650s having a ceiling panel 1650c and a floor panel 1650f attached on opposite sides using one of the join methods as described above forms the first portion 1670. The floor panel may have holes, pre-cut (the floor panel example 1653 as shown in FIGS. 18B and 18C) or added in later for customization for plantings. Alternatively, the floor panel may be used with raised planter boxes (the floor panel example 1654 as shown in FIG. 18D) placed on top of the netting floor panel. Floor panel 1652 (as shown in FIG. 18B) prevents burrowing animals from obtaining access to the plants. Floor panel 1650f may be made of netting having smaller cell openings as required to prevent entry by smaller animals as compared with the side and ceiling panels, which prevent larger animals such as deer. Three side panels may be attached in a line using one of the join methods as described above. One of the side panels includes a door for accessing the garden, created by either overlapping panels or using a zipper or other fastening mechanism as described above. An example of a side panel having an access opening is shown in FIG. 17A in the closed position, with fasteners or zippers 1665 secured, and in FIG. 17B for the open position, with the fasteners disengaged and the moveable panel portion (panel portion 1650p) shown rolled at top to provide access to the enclosure.

Example 8

Figure 18A:
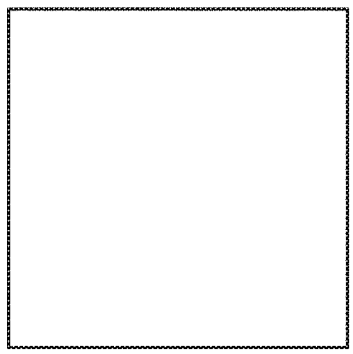
FIG. 18A is a top view of an enclosure having an open floor according to some embodiments of the present disclosure.
Figure 18C:
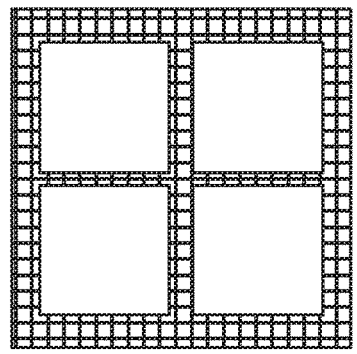
FIG. 18C is a top view of an enclosure having a perimeter of netting and a plurality of openings according to some embodiments of the present disclosure.

Another alternative embodiment of a cube shaped netting enclosure included a cube without a floor panel, the absence of a floor panel as in example 1651 as shown in FIG. 18A. Three side panels were attached in a line using one of the join methods as described above. A side panel with a ceiling panel was attached using one of the join methods. The side panel included a door for accessing the garden, created by either overlapping panels or using a zipper or other join method. Without a floor panel, the structure can be put over existing plantings easily. Landscape staples, or other securing means, may be used to secure the netting to the ground around the perimeter of the cube.

Netting Enclosure—Tunnel

Example 9

Figure 19:
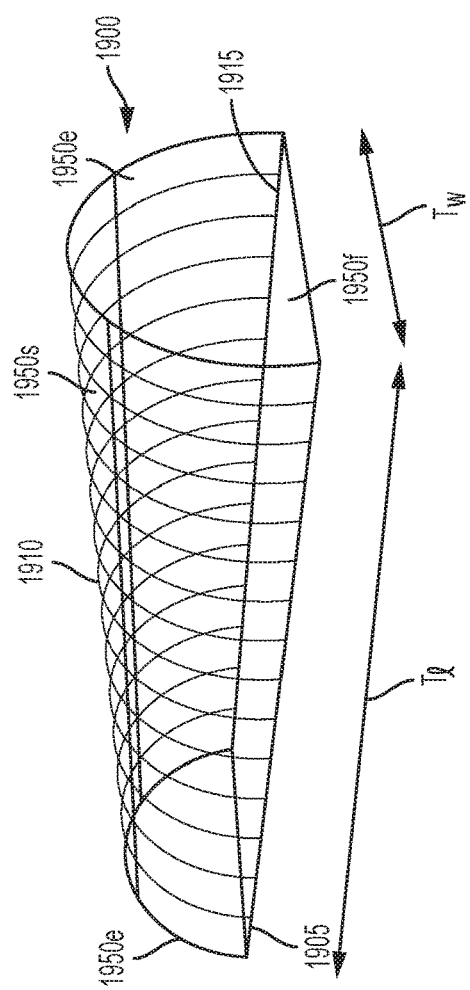
FIG. 19 is a perspective view of a tunnel shaped enclosure according to some embodiments of the present disclosure
Figure 22:
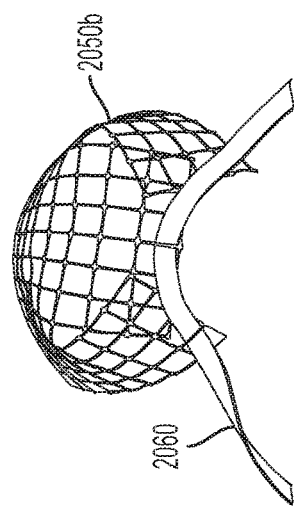
FIG. 22 is a side view of the panel of FIGS. 20 and 21 including pulling of the webbing to make taut.
Figure 21:
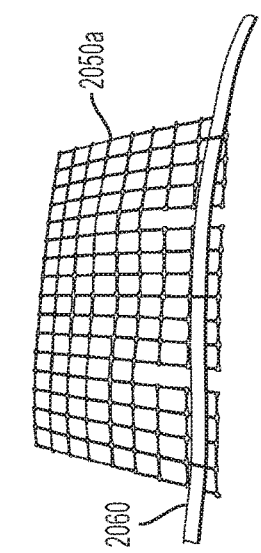
FIG. 21 is a side view of the panel of FIG. 20 including a webbing.
Figure 20:
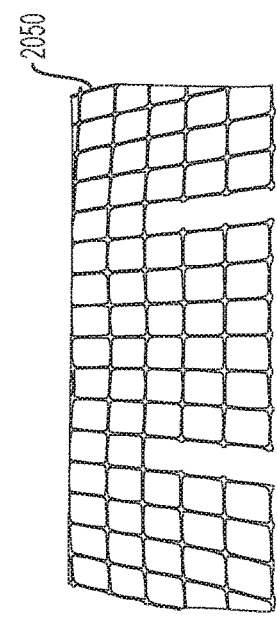
FIG. 20 is a side view of shaped panel by cutting a single row of openings for use in a tunnel shaped enclosure according to some embodiments of the present disclosure.

An alternative embodiment including a tunnel shaped enclosure 1900 having panel(s) of deer netting 1950s of sufficient width to go from the ground at side 1905 of the tunnel, up over the top of the tunnel 1910 and down to the ground on the other side 1915 as shown in FIG. 19. Floor panel 1950f is optionally included. Alternatively, panels are sized with an overage to the length to be used and secured as ground prevention for smaller animals such as rabbits burrowing into or under the netting enclosure. A sufficient number of panels are used to cover the length ($T_l$) on the tunnel shaped shelter framework. Panels are joined together using any of the join methods described. Webbing material used at the joins is also used to attach the enclosure to the ground. Panels 1950e for the ends of the tunnel are cut to the shape of the curve of the tunnel opening. A webbing material is woven in and out of the sides and top of the end panels. The end panels 1950e are attached to the frame using clips. One or both of the end panels has an opening for access created by overlapping the deer netting or using a fastener such as a zipper similarly as described above and as shown in FIGS. 17A-B. The last panel at each end over hangs the last support by several inches. The deer netting is shaped to the opening by: cutting the cross wise side walls of a single row of openings from the edge to the curved section of the last support at several locations along the edge of the last panel 2050 as shown in FIG. 20, and, weaving webbing 2060 through the last row of cells of panel 2050a, continuing where there is a break caused by the cuts. The webbing is fastened to the ground at both ends, pulling it taut and causing the netting to overlap at the cuts and curve over the edge of the end panel 2050b where it is attached to the last support. Sufficient cuts are made to create a smooth curve in the netting.

Operation

Assembly of the kit included setup of the skeleton or frame, extending it to its desired configurations, for example to its maximum length and width, and with the roof support fully raised. The support poles were left at the lowest setting for height. The roof of the netting enclosure was laid over the roof support so that the seams of the netting lay on top of the roof supports and the extra length of webbing was at the corners of the structure. The hook and loop closure faced outward.

The frame was then extended to its full height or second configuration. The walls were attached using the hook and loop tape with each wall panel overlapping the one adjacent to it with the overlap occurring in the middle of a side panel. Panels that contained a zipper were not overlapped.

The netting enclosure was secured to the ground using landscape staples. The netting enclosure was user accessible, i.e. to gain entry into the netting enclosure, by removing the landscaping staples at an overlap. The overlap was either left loose or held aside with a clip while the user required access into the netting enclosure. The netting enclosure was re-secured by replacing the staple in the ground.

Alternatively for netting enclosure configuration with overlapping side panels, only the inner wall panel was secured using a landscape staple. The outer panel was secured to the inner panel using a clip, which was easily removed for access and usable to hold the panel aside during access to the netting enclosure.

When a zipper was installed in the wall panel, access was achieved by unzipping the zipper. In this case, landscape staples are placed sufficiently far from the zipper to allow the panel to move for access within the netting enclosure.

Alternatively, two zippers were installed in the wall panel. Access was achieved by unzipping both zippers and rolling the door upward, where it is secured with clips. This created a flap for ease of user access.

Assembly of the cube shaped netting enclosure as in Example 6 is formed by placing the three-panel portion including the ceiling panel on the ground under the frame with the ceiling panel on top and the side panels overlapping underneath. The joined edges of the ceiling panel are lifted to the frame and attached using clips. The attached sides hang down from the attached edges. The floor section is placed on the ground under the frame with the floor panel on the bottom and the side panels overlapping on top of it. The unattached side edges are lifted to the frame and attached. Velcro strips on the side edges of the side panels are joined to completely enclose the cube. Landscape staples are used to secure the netting to the ground around the perimeter of the cube.

Assembly of the cube shaped netting enclosure as in Example 7 is formed by placing the ceiling section on the ground under the frame with the ceiling panel on top and the side and floor panels overlapping underneath. The edges of the ceiling panel are lifted to the frame and attached using clips. The attached side hangs down from the attached edges and the floor panel is opened out to lie underneath the frame. The side section is wrapped around three sides of the frame and attached to the frame at the top using clips. Velcro strips on the outer edges of the side panels are joined to completely enclose the cube. Landscape staples are used to secure the netting to the ground around the perimeter of the cube.

Assembly of the cube shaped netting enclosure having no floor panel as in Example 8 includes attaching a roof panel with Velcro around the perimeter, which is lifted to the frame and attached with clips. A continuous length of deer netting is provided around the outside of the frame. The two are overlapped to create an opening or are joined with a zipper or other fastener for entrance. The upper edge of the netting has Velcro to attach to perimeter of roof panel. Landscape staples are used to secure the netting to the ground around the perimeter of the cube.

As one of skill in the art would appreciate, any of the embodiments above could be combined.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A netting kit comprising:
   a skeleton configured to operate in a plurality of configurations between a first, partially expanded configuration and a second, fully expanded configuration;
   a netting enclosure comprising a plurality of panels configured to be joined together to enclose or hang from the skeleton in each of the plurality of configurations, wherein the plurality of panels comprise a first panel and a second panel, wherein the first panel comprises a first plurality of cells, and the second panel comprises a second plurality of cells;
   a first webbing connected to the first panel by weaving the first webbing in and out of the first plurality of cells;
   a second webbing connected to the second panel by weaving the second webbing in and out of the second plurality of cells; and
   a fastener configured to be attached to the first webbing and to the second webbing to form an openable and closeable seam.

2. The netting kit of claim 1, wherein the plurality of panels includes a third panel configured to overlap a fourth panel, the netting kit further comprising a third webbing configured to secure the third panel to the fourth panel by weaving in and out of cells in the third panel and the fourth panel.

3. The netting kit of claim 2, wherein the third webbing secures the third panel to the fourth panel without creating openings that permit animal access.

4. The netting kit of claim 1, wherein the plurality of panels are joined together into two separate sections: a first section in which the first panel is orthogonally joined to two other panels and a second section in which at least two panels are orthogonally joined together, wherein the first section and the second section are configured to be joined together to enclose the skeleton or hang from it.

5. The netting kit of claim 1, and wherein the skeleton is configured to operate in the fully expanded configuration without sinking posts into the ground.

6. A netting enclosure for preventing deer access, the netting enclosure comprising:
   a plurality of panels each having a first face, a second face opposite the first face, and a plurality of cells encompassing openings connecting the first face and the second face, the plurality of cells sized to enable pollinator access while prohibiting access to deer; and
   at least one webbing material configured to join at least two adjacent panels together by alternately interconnecting cells of the adjacent panels to form a seam that prevents deer access between the adjacent panels,
   wherein at least one of the plurality of panels includes a fastening mechanism configured to create a seam that is openable and closeable.

7. The netting enclosure of claim 6, wherein at least a first panel, a second panel, and a third panel of the plurality of panels are joined together in a predefined configuration in which the first face of the first panel lies is a first plane, the first face of the second panel lies in a second plane substantially orthogonal to the first plane, and the first face of the third panel lies in a third plane substantially orthogonal to the second plane, and wherein the at least one webbing material is configured to join at least one of the first panel, the second panel, and the third panel to a fourth panel by alternately interconnecting cells of the panels to form the seam that prevents deer access.

8. The netting enclosure of claim 6, wherein the plurality of panels includes a first panel having a first boundary and a second panel having a second boundary, wherein a portion of the first panel is configured to overlap a portion of the second panel, with the overlapping portions each including at least a portion of the cells.

9. The netting enclosure of claim 8, wherein the first boundary and the second boundary overlap to align at least a portion of the cells of the first panel with at least a portion of the cells of the second panels, wherein the at least one webbing material is configured to weave through the aligned cells of the first and second panels to form a seam.

10. The netting enclosure of claim 6, wherein the plurality of panels includes a first panel having a first edge portion and a second panel having a second edge portion, each edge portion including a plurality of the cells, wherein the at least one webbing material is configured to interconnect adjacent edge portions to form a foldable seam.

11. The netting enclosure of claim 6, wherein the at least one webbing material is configured to join two adjacent panel portions together by alternately interconnecting cells of the adjacent panel portions to form the seam without a skeletal structural member.

12. A method of making a netting enclosure to prevent animal access, the method comprising:
    shaping panels of netting material around or hanging from a skeleton, the panels including cells encompassing openings configured to allow pollinator access and prohibit animal access;
    aligning cells of adjacent panels;
    interconnecting adjacent panels with a webbing material to form a seam that prohibits the animal access; and
    installing a fastening mechanism to form a seam in at least one of the interconnecting adjacent panels, the seam configured to be openable and closeable.

13. The method of claim 12, wherein the step of aligning cells of adjacent panels includes overlapping a first portion of a first panel with a second portion of a second panel.

14. The method of claim 12, wherein the step of aligning cells of adjacent panels includes positioning a first plurality of cells of a first panel adjacently to a second plurality of cells of a second panel.

15. The method of claim 12, wherein the webbing material is a strap or a coil, and wherein interconnecting adjacent panels with the webbing material includes weaving the webbing material alternately through cells in adjacent panels.

16. The method of claim 12, further comprising installing the netting enclosure onto a skeleton.

* * * * *